(12) United States Patent
Kokatsu et al.

(10) Patent No.: US 7,357,209 B2
(45) Date of Patent: Apr. 15, 2008

(54) ELECTRICALLY ASSISTED BICYCLE WHICH ENABLES AEROBIC EXERCISE

(75) Inventors: Kyosuke Kokatsu, Osaka (JP); Akihito Yoshiie, Osaka (JP); Fumihito Nigara, Osaka (JP)

(73) Assignees: Sunstar Giken Kabushiki Kaisha, Osaka (JP); Sunstar Suisse SA, Ecublens (CH)

( * ) Notice: Subject to any disclaimer, the term of this patent is extended or adjusted under 35 U.S.C. 154(b) by 245 days.

(21) Appl. No.: 10/503,747

(22) PCT Filed: Feb. 3, 2003

(86) PCT No.: PCT/JP03/01068

§ 371 (c)(1),
(2), (4) Date: Feb. 18, 2005

(87) PCT Pub. No.: WO03/066421

PCT Pub. Date: Aug. 14, 2003

(65) Prior Publication Data

US 2005/0140113 A1 Jun. 30, 2005

(30) Foreign Application Priority Data

Feb. 8, 2002 (JP) .............................. 2002-032418

(51) Int. Cl.
*B62M 23/02* (2006.01)

(52) U.S. Cl. ...................... 180/206; 180/207

(58) Field of Classification Search ................ 180/205, 180/206, 207
See application file for complete search history.

(56) References Cited

U.S. PATENT DOCUMENTS 4,456,277 A * 6/1984 Carpenter ................... 280/282

(Continued)

FOREIGN PATENT DOCUMENTS

EP 0 798 204 10/1997

(Continued)

OTHER PUBLICATIONS

International Search Report for PCT/JP03/01068; ISA/JP; Mailed: May 20, 2003.

(Continued)

*Primary Examiner*—Kevin Hurley
(74) *Attorney, Agent, or Firm*—Harness, Dickey & Pierce, P.L.C.

(57) ABSTRACT

To provide an electromotive power assisted bicycle enabling an aerobic exercise with a light weight and simple mechanism, an electromotive power assisted bicycle 1 comprises a pedal effort detection means for detecting a pedal effort (99, 126), a drive unit 13, a force combining mechanism for transmitting a rotational torque of a speed reducing unit to a drive shaft, and a heart rate detection sensor 254. The drive unit 13 comprises an electric motor 37 and a speed reducing unit 35 having an electromagnetic clutch 250. In a mode enabling the aerobic exercise, if the detected pedal effort is higher than the pedal effort level enabling the aerobic exercise, the drive unit 13 drives the electric motor 37 under the condition of the electromagnetic clutch 250 being engaged and thus assists the pedal effort with the electric force. If the detected pedal effort is lower than said pedal effort level, the electric motor is turned off under the condition of the electromagnetic clutch 250 being engaged, and thus applies a loading force to the pedal effort by the rotational resistance of the motor. The pedal effort level can be adjusted in response to the detected heart rate of the rider.

11 Claims, 17 Drawing Sheets

U.S. PATENT DOCUMENTS

| | | | |
|---|---|---|---|
| 4,911,427 A | 3/1990 | Matsumoto et al. | |
| 5,242,028 A * | 9/1993 | Murphy et al. | 180/220 |
| 6,276,479 B1 * | 8/2001 | Suzuki et al. | 180/207 |
| 6,446,745 B1 * | 9/2002 | Lee et al. | 180/206 |
| 6,851,497 B1 * | 2/2005 | Yoshiie et al. | 180/206 |

FOREIGN PATENT DOCUMENTS

| | | |
|---|---|---|
| EP | 0 994 015 | 4/2000 |
| EP | 1295785 A1 * | 3/2003 |
| JP | 04-100790 | 4/1992 |
| JP | 04100790 A * | 4/1992 |
| JP | 9-286375 | 11/1997 |
| JP | 10-318860 | 12/1998 |
| JP | 11-240481 | 9/1999 |
| JP | 61-137570 | 9/1999 |
| JP | 2003203319 A * | 7/2003 |
| WO | WO 0075006 A1 * | 12/2000 |
| WO | WO 2006029514 A1 * | 3/2006 |

OTHER PUBLICATIONS

Supplementary Search Report issued on Mar. 6, 2007.
European Examination Report dated Jul. 3, 2007 applying references already of record in the instant application.

* cited by examiner

Fig.9
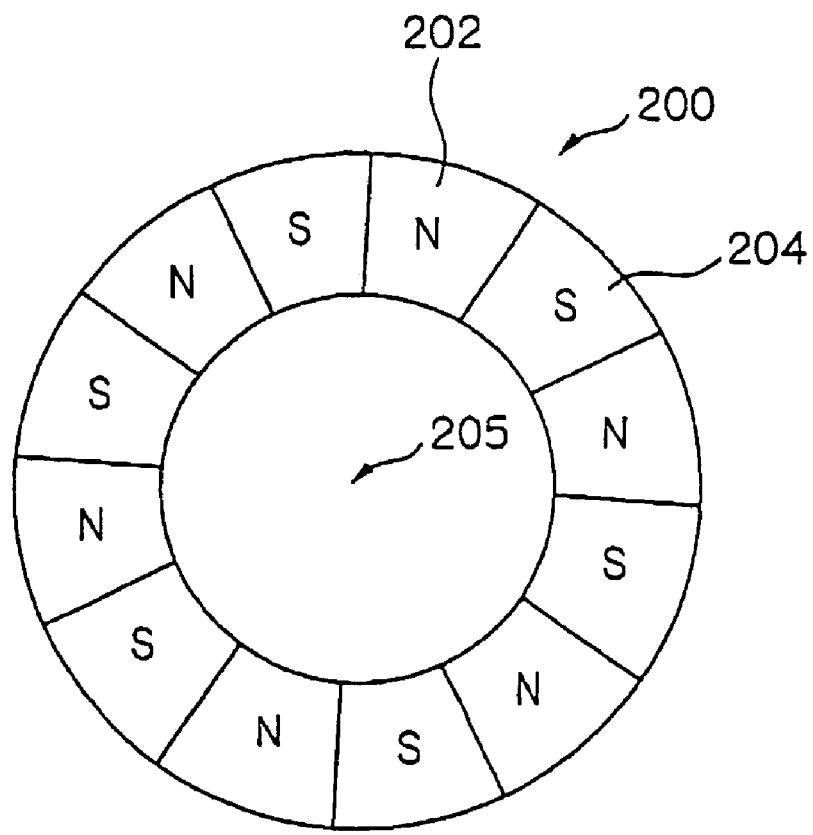
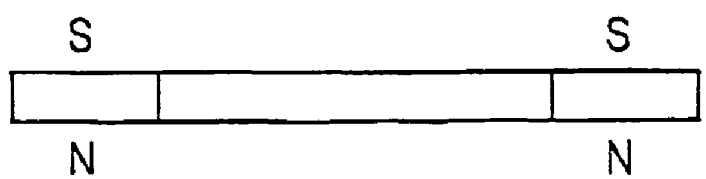

Fig. 10
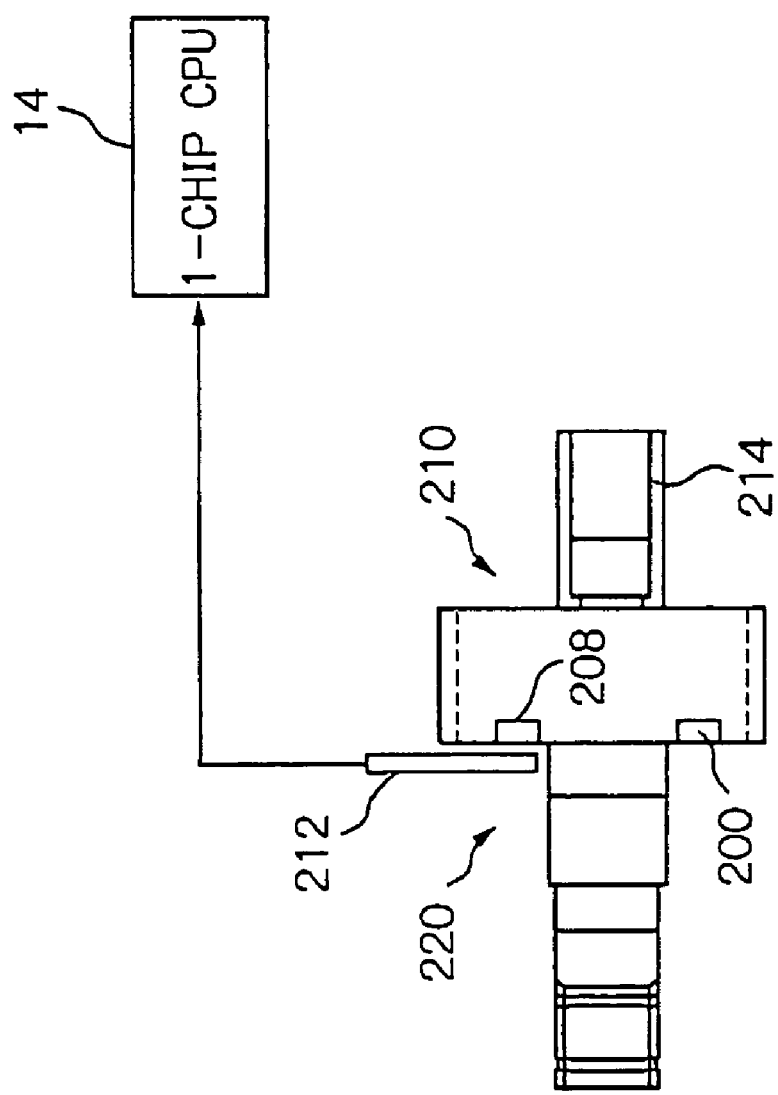
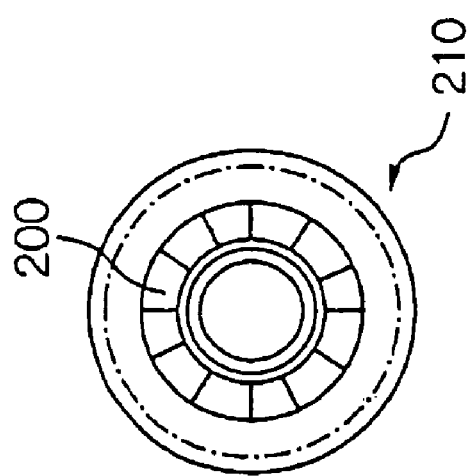

Fig. 12
(a)
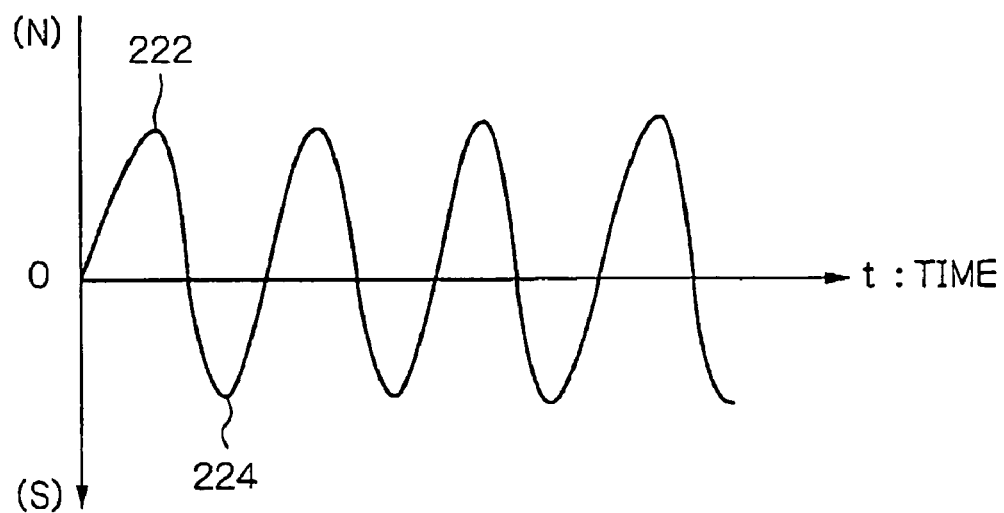
(b)
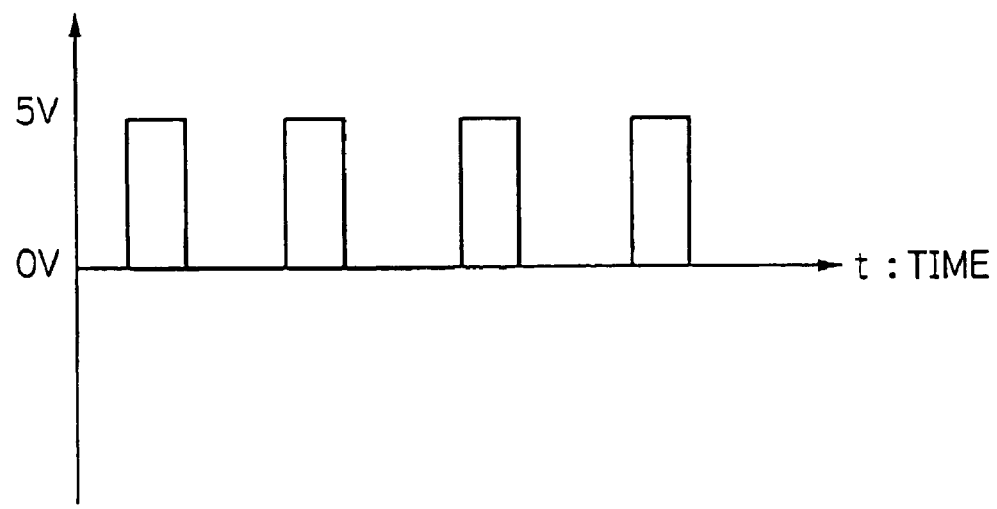

Fig. 17
(a)
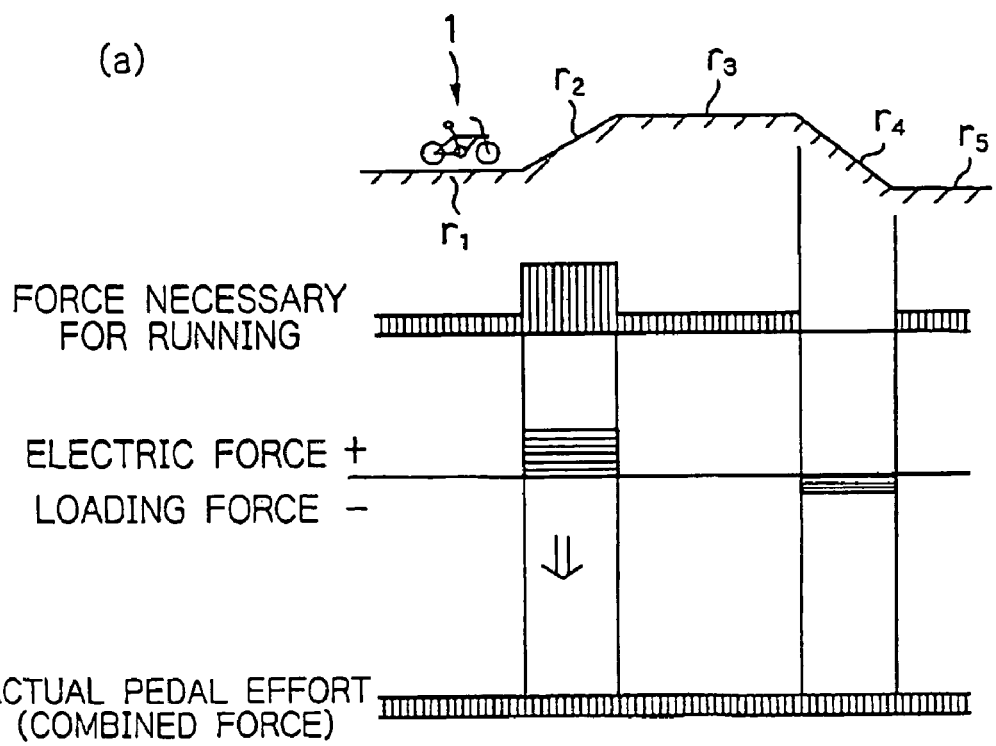
(b)
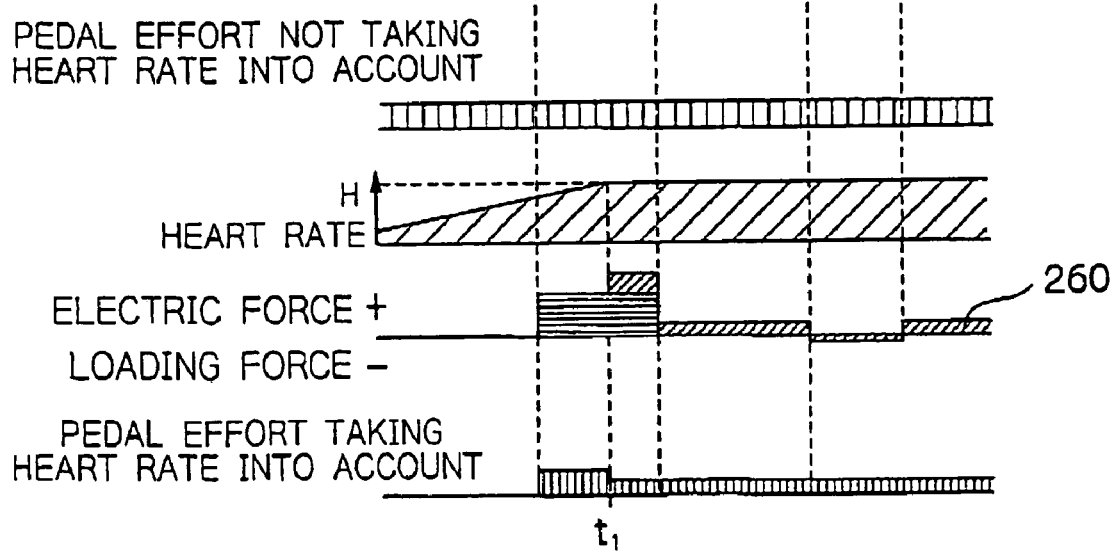

ELECTRICALLY ASSISTED BICYCLE
WHICH ENABLES AEROBIC EXERCISE

CROSS-REFERENCE TO RELATED APPLICATIONS

This application is a National Stage of International Application No. PCT/JP03/01068 filed 03 Feb. 2003, published as WO 03/066421 on 14 Aug. 2003, which claims the benefit of Japanese application number 32418/2002, filed 08 Feb. 2002. The disclosures of the above applications are incorporated herein by reference.

FIELD OF THE INVENTION

The present invention relates to an electromotive power assisted bicycle that can run with a pedal effort assisted by an electric force, and more specifically to an electromotive power assisted bicycle that enables a rider to perform a specific exercise, especially an aerobic exercise.

DESCRIPTION OF THE PRIOR ART

In recent years, health promotion and caloric expenditure through light sport has been suggested. Particularly ideal training suitable for everyone by using an instrument is cycling. Cycling, even on a flat surface, can provide aerobic exercise to thereby burn fat with little effort. Herein, aerobic exercise means exercise for burning fat by taking exercise for more than 20 minutes with a small effort and thereby distributing oxygen to every part of the body, which is different from exercise for muscle building. In a bicycle equipped with a gear shifting system, on a flat surface, the bicycle may be high-geared to thereby increase running speed, so that wind and/or rolling resistance will be increased to provide a heavier load or suitable conditions according to a rider's requirements.

However, when cycling over typical land including many upward and downward slopes, an ascent inevitably leads to increased pedaling (in short, requires more effort) and this motion results in a muscle exercise to build muscles on thighs and calves. On the other hand, when descending, the load against the action from the pedal effort may decrease to null, resulting in no caloric expenditure.

To address this problem, a variety of bicycle-type indoor health appliances have been used to provide steady training according to a schedule, but such health appliances, due to their indoor installation, are associated with such a problem that a space available for exercising is limited and thus enjoyment of the exercise is extremely diminished. There is another problem that indoor installation may take up a lot of space.

To this end, according to an art disclosed in Japanese Patent Laid-open Publication No. Hei 10-203467, there has been suggested an electromotive power assisted bicycle that is additionally provided with an electric force to assist a pedal effort, characterized in that an adequate training effect can be obtained without being affected by changes in a running environment. In one aspect of an electromotive power assisted bicycle according to this art, the electromotive power assisted bicycle comprises a man-powered drive system and an electrically powered drive system including an electric motor for assisting a pedal effort, which are arranged in parallel, and further comprises a loading section for applying a rotational resistance to a wheel and a control section for controlling an output from the electric motor and an application of a load by the loading section based on a difference between actual man power by a rider (a detected pedal effort×a crank rotational speed) and a default power that has been previously set. According to this art, since the man power is greater on upward slopes or at a high speed, the control section may control the electric motor to increase the electric force so as to maintain the man power at a default power level and to prevent an excessively high load from being applied to the human body. On the contrary, when the input shaft rotational speed of the man-powered drive system is not higher than a predetermined value and the pedal effort is also not higher than a predetermined value, the control section determines that the cycle is moving downhill and controls the output value of the loading section to adjust the bicycle speed to zero. When the cycle is moving downhill, the bicycle is driven forward on its own without the need for the pedal effort in the prior art, but in contrast to this, in the electromotive power assisted bicycle according to this art, it is necessary to apply the pedal effort against the load from the loading section, thereby allowing a certain amount of caloric expenditure to be performed in response to the power.

Therefore, the above-described art is considered to be suitable for providing a light and constant exercise for many hours even in a typical land form including many upward and downward slopes and conveniently facilitating a reduction in body fat and an improvement in metabolic function through the aerobic exercise.

It is to be noted that the above-described publication has further disclosed an example in which at least one braking system is also used as the loading section.

However, in the prior art disclosed in said publication, an electromotive power assisting unit containing the electric motor is disposed in the vicinity of the crank shaft and the loading unit serving as a hydraulic disk brake system acting on a rear wheel is disposed in the vicinity of the rear wheel. With such a configuration, where in addition to the electromotive power assisting unit, the hydraulic disk braking system of large scale is arranged separately, the entire mechanism of the electromotive power assisted bicycle is complicated and the weight thereof is increased. Further disadvantageously, there will be a possible demand for fabrication of a frame dedicated for mounting the complicated mechanism, and this may lead to increased cost by failing to utilize the typical frame manufacturing process.

Further, the above-described publication includes a description of various examples of exercise program control patterns, and the rider is requested to select the control pattern in advance. Due to this, it is difficult to respond to a difference in physical strength and/or in health condition in association with individual riders at a time of riding and to a change in physical condition when changing riders.

Furthermore, owing to such a configuration that the load is applied by the braking on the rear wheel, the rider is not allowed to perform the exercise program during a period of no running (i.e., during the time the bicycle speed is zero) with the rear wheel in contact with the ground. For example, while waiting for a traffic light to change, the exercise must be suspended temporarily, and the above publication has not disclosed any solutions therefore.

The present invention has been made in the light of the above facts, and an object thereof is to provide an electromotive power assisted bicycle having a simple mechanism that solves the problems associated with the prior art described above.

SUMMARY OF THE INVENTION

To solve the above problems, the present invention provides an electromotive power assisted bicycle capable of running by a pedal effort that is assisted by an electric force, said bicycle comprising a pedal effort detection means for detecting a pedal effort and an auxiliary power means that can select either one of an electric force or a loading force based on at least the pedal effort detected by said pedal effort detection means and add the selected force to the pedal effort so as to control the pedal effort to a level allowing for smooth aerobic exercise.

The electromotive power assisted bicycle of the present invention, in a normal assisting mode, uses the electric force output from the auxiliary power means based on the pedal effort detected by the pedal effort detection means to assist the pedal effort for running of the bicycle.

In an aerobic exercise mode enabling the aerobic exercise, which is a feature of the present invention, the auxiliary power means can select either one of the electric force or the loading force based on at least the pedal effort detected by said pedal effort detection means and add the selected force to the pedal effort so as to control the pedal effort to fall within a range of a level enabling the aerobic exercise. For example, in a case of running on an upward slope that could otherwise cause the detected pedal effort to exceed said pedal effort level enabling the aerobic exercise, the auxiliary power means controls the electric force to be output such that the pedal effort may fall within a range of said specified pedal effort level. Owing to this, caloric expenditure can be achieved, while preventing the muscular movement by the load otherwise generated by pedaling up the slope. Further, in a case of running on a downward slope that could otherwise make the detected pedal effort smaller than said pedal effort level for the aerobic exercise, the auxiliary power means controls the loading force to increase until the detected pedal effort reaches said specified pedal effort level. This may urge the rider to apply the pedal effort against the loading force to thereby induce the caloric expenditure. It is to be noted that the pedal effort level may extend over a certain range.

Thus, in the present invention, the auxiliary power means capable of outputting an assisting electric force, in itself, can output not only the electric force but also the loading force. In a preferred embodiment, the auxiliary power means is configured as a single unit. Accordingly, as compared to the prior art in which the loading system has been embodied as a large scale braking system separate from the electromotive power unit, the present invention can simplify the mechanism of the entire electromotive power assisted bicycle and reduce the weight thereof. Further, the present invention minimizes the need for fabricating a dedicated body frame, and allows existing frame manufacturing processes to be utilized.

In another preferred embodiment of the present invention, an electromotive power assisted bicycle further comprises a heart rate detection means for detecting a heart rate of a rider, in which the auxiliary power means sets the pedal effort level based on the heart rate detected by the heart rate detection means. For example, if the heart rate is high, the set pedal effort level will be decreased, but on the contrary, if the heart rate is low, then the set pedal effort level will be increased. This may make it possible to respond to a difference in physical strength and/or in health condition in association with an individual rider at a time of riding and to a change in physical condition when changing riders, thereby enabling an adequate aerobic exercise to be performed.

In an embodiment for realizing the loading force to be output from the auxiliary power means, the electromotive power assisted bicycle may further comprise a force combining means for combining the electric force or the loading force output selectively by said auxiliary power means with the pedal effort, wherein said auxiliary power means has an electric motor, and further an electromagnetic clutch is provided between the electric motor and the force combining means. At this time, the loading force is given as a rotational resistance of said electric motor, which will be generated by coupling the electric motor with the force combining means with the electromagnetic clutch in a condition where the electric motor is not supplied with electric power. Thus, since the means for providing the assisting force and the loading force are integrated into a single unit, the simplification of the body can be more strongly promoted. It is to be noted that during a normal running operation, which is neither in the assisting mode nor in the aerobic exercise mode, the electromagnetic clutch may be released to avoid application of motor loading.

Preferably, the auxiliary power means has a speed reducing means interposed between an output shaft of the electric motor and the force combining means to reduce a rotational speed of the electric motor. More preferably, the speed reducing means may be provided with a system for changing a reduction ratio. In this case, the auxiliary power means can adjust the loading force by changing the reduction ratio of the speed reducing means. If a battery for supplying the electric motor with electric power has been provided, preferably, a circuit associated with said battery may be designed such that the battery can be charged with an electromotive force generated in the electric motor when the motor is rotated by the pedal effort against the loading force of the motor under a condition where the battery does not supply the motor with electric power. In this way, the loading force may be made greater, while at the same time, the effort of charging may be omitted to thereby facilitate the use of the electromotive power assisted bicycle.

Alternatively, in an embodiment for using the rotational resistance of the electric motor as the loading force, the electromotive power assisted bicycle may further comprise a clutch mechanism which enables an inverse rotation of the pedal or an on-off switching of the pedal effort transmission to the wheel so that the rider is allowed to perform the aerobic exercise even under a condition of no running (i.e., when the bicycle speed is zero) with the rear wheel in contact with the ground.

In an electromotive power assisted bicycle equipped with a primary sprocket capable of rotating for transmitting a pedal effort to a driving wheel, a preferred embodiment of a force combining mechanism comprises a secondary sprocket capable of rotating coaxially with the primary sprocket, a power sprocket to be rotated by an auxiliary power means and an assist chain stretched between the secondary sprocket and the power sprocket.

According to this embodiment, as the auxiliary power means outputs an electric force, the power sprocket is rotated by said electric force. A rotational torque of the power sprocket is transmitted to the secondary sprocket via the assist chain stretched over said power sprocket. The thus rotated secondary sprocket is coaxially rotated together with the primary sprocket, so that the electric force may be transmitted to the primary sprocket immediately. The primary sprocket transmits the resultantly combined force consisting of the pedal effort and the electric force to the driving wheel.

On the contrary, when the electric motor is not supplied with electric power, the pedal effort which has been supplied to the primary sprocket acts to rotate the electric motor via the secondary sprocket and the power sprocket to thereby provide a load to resist against the pedal effort. With the aid of this configuration employing a double chain system, the degree of freedom for installing the auxiliary power means can be significantly extended. For example, the power sprocket can be placed in any desired location along a circumferential direction of the secondary sprocket (and thus the primary sprocket). Further, if the length of the assist chain is changed, a distance from the secondary sprocket (and thus the primary sprocket) to the power sprocket can be modified as desired.

As for the auxiliary power means, in one example, the pedal effort level can be set to an approximately constant value of the pedal effort level. It is a matter of course that a pedal effort pattern can be set such that it may vary as a function of the time as desired, as far as it falls in a range allowing for the aerobic exercise. For example, in an alternative preferred embodiment, the electromotive power assisted bicycle further comprises a rotational speed detection means for detecting a rotational speed of a drive shaft, wherein the auxiliary power means adjusts the pedal effort level based on a power defined by a product of the detected pedal effort and the detected rotational speed of the drive shaft. In the latter embodiment, since the adjustment is provided not simply based on the pedal effort but also based on the actual power that can reflect the amount of the caloric expenditure more accurately, the aerobic exercise can be carried out in a more appropriate manner.

More preferably, the electromotive power assisted bicycle further comprises a time measuring means for measuring a desired time period, wherein when an integral value of a power relating to the time measured by the time measuring means has reached a predetermined value, the auxiliary power means stops an operation mode enabling the aerobic exercise and is shifted to the normal assisting operation mode. In this way, a predetermined amount of aerobic exercise can be yielded appropriately.

According to an alternative preferred embodiment of the present invention, an electromotive power assisted bicycle further comprises an one-way clutch means operatively coupling the drive shaft with the primary sprocket such that a rotation of the drive shaft substantially in one direction may exclusively be transmitted to the primary sprocket, wherein a preferred pedal effort detection means detects a physical quantity that will vary in response to a deformation of the one-way clutch means caused by the pedal effort.

In this embodiment, since the assisting force is controlled based on the physical quantity that varies in response to the deformation of the one-way clutch means caused by the pedal effort, said one-way clutch means being essential to the bicycle, other separate parts such as a large coil spring, a circular disk or the like for detecting a torque, which are incorporated in the electromotive power assisted bicycle of the prior art but are not used in the ordinary bicycle, can be eliminated. Thus, even in the pedal effort detection means, the modification of the body frame can be suppressed to a minimal range, and so the present embodiment, along with the above-described effects in respective embodiments, can facilitate simplification of the entire electromotive power assisted bicycle of the present invention.

According to another aspect of the present invention, there is provided an electromotive power assisted bicycle capable of running by a pedal effort that is assisted by an electric force, said bicycle comprising a pedal effort detection means for detecting a pedal effort, a hear rate detection means for detecting a heart rate of a rider, a pedal effort setting means for setting a pedal effort level that enables an aerobic exercise based on at least the heart rate detected by the heart rate detection means, and an auxiliary power means that can add an electric force to a pedal effort such that the pedal effort detected by the pedal effort detection means falls in a range of said pedal effort level set by the pedal effort setting means.

Other objects and advantages of the present invention will be understood more clearly by reading the following description of preferred embodiments of the present invention with reference to the attached drawings, which will be described below.

BRIEF DESCRIPTION OF THE DRAWINGS

FIG. 9 is a top plan view and a side elevation view of an NS polarized ring magnet serving as one component of a rotational speed sensor to be assembled in an electromotive power assisted bicycle of the present invention;

FIG. 10 is a front elevation view showing the rotational speed sensor that has been built up by mounting the NS polarized ring magnet of FIG. 9 onto a surface of a gear as well as a side elevation view taken along the normal line of said rotational speed sensor;

FIG. 12 is a waveform representing a temporal variation of a magnetic field signal detected by a Hall IC disposed adjacent to the NS polarized ring magnet;

FIG. 17 is a diagram illustrating a specific procedure of control and its result for running on the illustrated road in the process of FIG. 4, wherein (a) relates to the control not taking a heart rate into account and (b) relates to the control taking the heart rate into account.

PREFERRED EMBODIMENTS OF THE PRESENT INVENTION

A preferred embodiment of the present invention will now be described with reference to the attached drawings.

Figure 1:
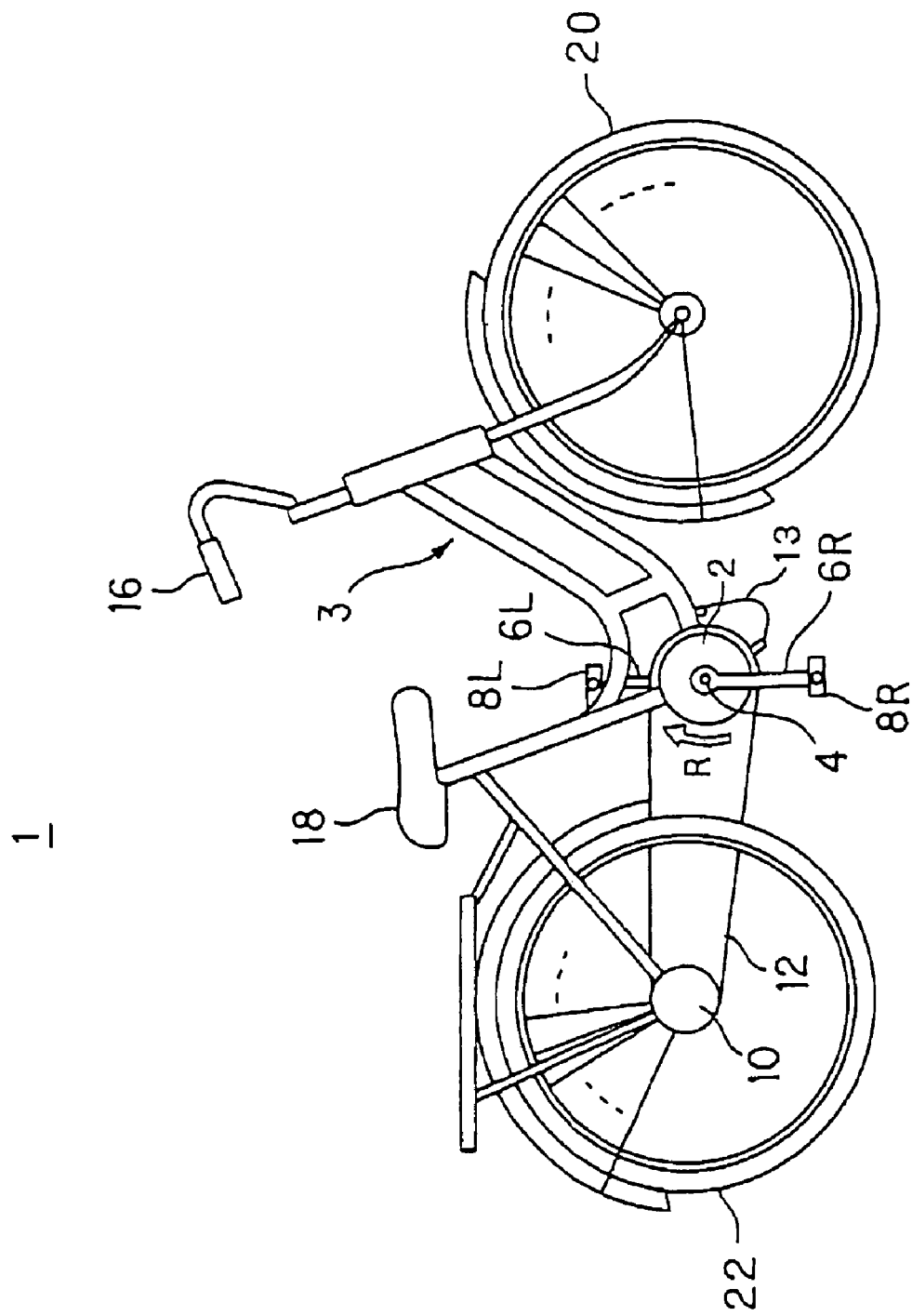
FIG. 1 is a schematic diagram of an electromotive power assisted bicycle according to the present invention.

FIG. 1 shows a general configuration of an electromotive power assisted bicycle 1 according to a first embodiment of the present invention. As shown in FIG. 1, a main frame structure of this electromotive power assisted bicycle 1 comprises, similarly to an ordinary bicycle, a body frame 3 made of metal pipe, and to said body frame 3 are mounted a front wheel 20, a rear wheel 33, a handle 16, a saddle 18 and so on in a known manner.

Further, a drive shaft 4 is rotatably supported in a lower central portion of the body frame 3, and a left and a right end of the drive shaft 4 are fitted with pedals 8L, 8R via crank bars 6L, 6R. This drive shaft 4 is coaxially fitted with a primary sprocket 2 via a one-way clutch (see FIG. 7(b), 99, which will be described later) for transmitting the revolution exclusively in the R direction corresponding to the forward driving direction of the body. An endless chain 12 is stretched between this primary sprocket 2 and a rear wheel power mechanism 10, which is disposed in a central location of the rear wheel 22.

The electromotive power assisted bicycle 1 of the present embodiment can run in either one of an aerobic exercise mode enabling a rider to perform an aerobic exercise during running, or an electromotive power assisting mode for running by the pedal effort with the assistance of the electric force according to at least an assisting ratio (assisting electric force/pedal effort) determined based on the bicycle running speed and the pedal effort, or a normal operation mode representing an application as an ordinary bicycle with no added electric force or loading force.

Figure 2:
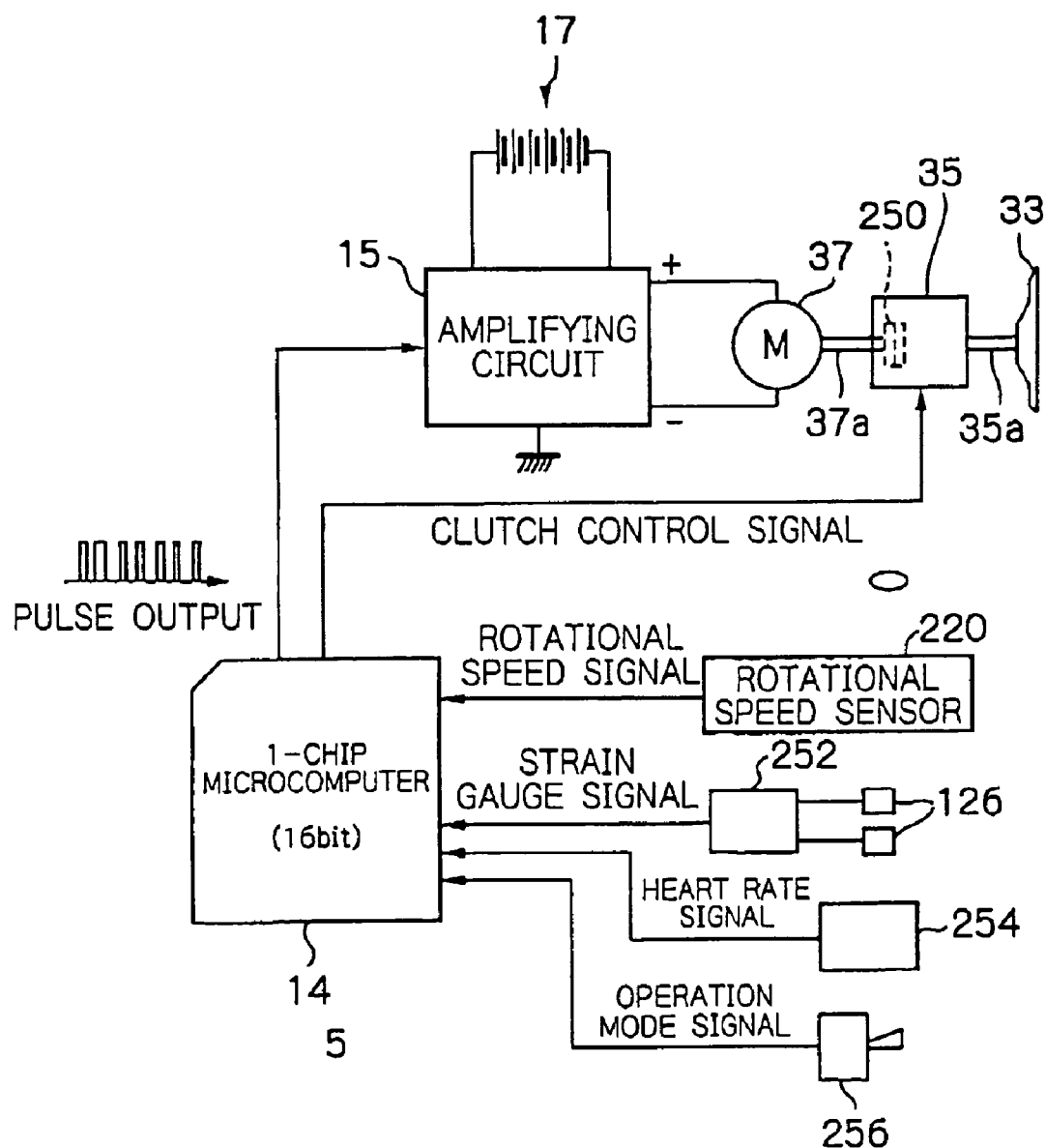
FIG. 2 is a schematic diagram showing a control system and a detection system of an electromotive power assisted bicycle of the present invention.

Turning now to FIG. 2, an overview of the main section for executing the aerobic exercise mode and an electromotive power assisting mode in an electromotive power assisted bicycle 1 according to the present embodiment will be described. This main section is controlled by a single 16-bit 1-chip microcomputer 14. The 1-chip microcomputer 14, in which one unit of data or command is composed of 16 bits, executes a processing according to a desired program stored in a non-volatile memory, not shown. The 1-chip microcomputer is further incorporated with a clock function and it can measure a time period during a desired event by a clock count.

The control system by the 16-bit 1-chip microcomputer includes a PWM controllable electric motor 37 and an amplifying circuit 15 for amplifying an electric power of a control signal output from the 1-chip microcomputer 14 and then outputting it to said electric motor 37. It is to be noted that a battery 17 is connected to the amplifying circuit 15 to supply electric power to the electric motor 37. The 1-chip microcomputer 14 executes an arithmetic operation to determine an assisting force according to the predetermined algorithm as will be described later, and sequentially outputs pulse signals that have been modulated to have pulse widths corresponding to said assisting forces to instruct the electric motor 37 to output the rotational torques in response to said assisting forces. It is to be noted that the amplifying circuit 15 is equipped with not only the electric power amplifying function for the pulse signals but also a function as a buffer for the pulse signals.

An output shaft 37a of the electric motor 37 is connected with a speed reducing unit 35 for reducing a rotational speed of the electric motor at a variable reduction ratio, and further an output shaft 35a of the speed reducing unit 35 is connected with a power sprocket 33 for combining the output electric force with the pedal effort. The details of the force combining mechanism will be described later.

The speed reducing unit 35 may be embodied by an epicyclic gear mechanism comprising, for example, a sun gear, a planet gear, a ring gear, a clutch and so on. In an example of this configuration, the reduction ratio of the speed reducing unit 35 can be controlled by providing an electromagnetic control of the engagement and disengagement of a variety of clutches through control signals from the 1-chip microcomputer 14. Further, the speed reducing unit 35 is provided with an electromagnetic clutch 250 on a rotational torque transmission path from the output shaft 37a of the electric motor 37 to the output shaft 35a of the speed reducing unit 35. This electromagnetic clutch 250 moves to an engaged position or a disengaged position in response to the control signal from the 1-chip microcomputer 14 to thereby turn on or off the transmission of the rotational torque to the power sprocket 33.

On the other hand, if the electromagnetic clutch 250 moves into the engaged position in the state where the electric motor 35 is not supplied with electric power, the electric motor 35 is rotated by the rotational torque from the power sprocket 33 or by the pedal effort, wherein a reaction torque produced in the electric motor 35 will act as a loading force against the pedal effort. At the same time, an electromotive force is generated in the electric motor 35. The amplifying circuit 15 may be designed such that this electromotive force of the motor is used to charge the battery 17. It is to be appreciated that the battery may be charged by way of polarity inversion in response to the rotational direction of the motor, so that no matter which direction the motor may rotate, polarity of the voltage supplied to the battery should be always the same.

The main section of the detection system shown in FIG. 2 includes: a rotational speed sensor 220 for detecting a rotational speed of a part reflecting the bicycle speed, for example, the drive shaft 4; at least two strain gauges 126 for outputting a signal representative of a pedal effort; an arithmetic operation section 252 for averaging (or adding and outputting) the output signals from said strain gauges and outputting it; a heart rate detection sensor 254 for detecting a heart rate of a rider; and a mode shifting switch 256 for shifting the mode among said three operation modes. The output signals or the rotational speed signal, the strain gauge signal, the heart rate signal and the operation mode signal are input to the 1-chip microcomputer 14 and stored in a memory not shown.

It is to be noted that the 1-chip microcomputer 14 stores a code for identifying the operation mode designated by the mode shifting switch 256 as an operation mode flag "Fd", and in addition, the 1-chip microcomputer is provided with a function to rewrite the operation mode flag Fd to a code representing the normal operation mode in such a condition where there remains insufficient capacity of the battery, or the temperature of the electric motor is out of the acceptable range, even if the mode shifting switch 256 designates the aerobic exercise mode or the electromotive power assisting mode.

The torque detection mechanism using the rotational speed sensor 220 and the strain gauge 126 will be described later in detail.

The heart rate detection sensor 254 may use a well-known sensor wearable on any desired sites on the body, including, for example, an ear, a fingertip or an arm of the rider. Further, instead of the heart rate detection or in addition to this, such a sensor that can detect a variety of parameters of the human body, such as a blood pressure, may be employed.

[Force Combining and Auxiliary Power Mechanism]

The force combining mechanism for combining the assisting force and the pedal effort in the electromotive power assisted bicycle 1 and a mechanism for supplying said assisting force are described with reference to FIGS. 6 through 8.

Figure 6:
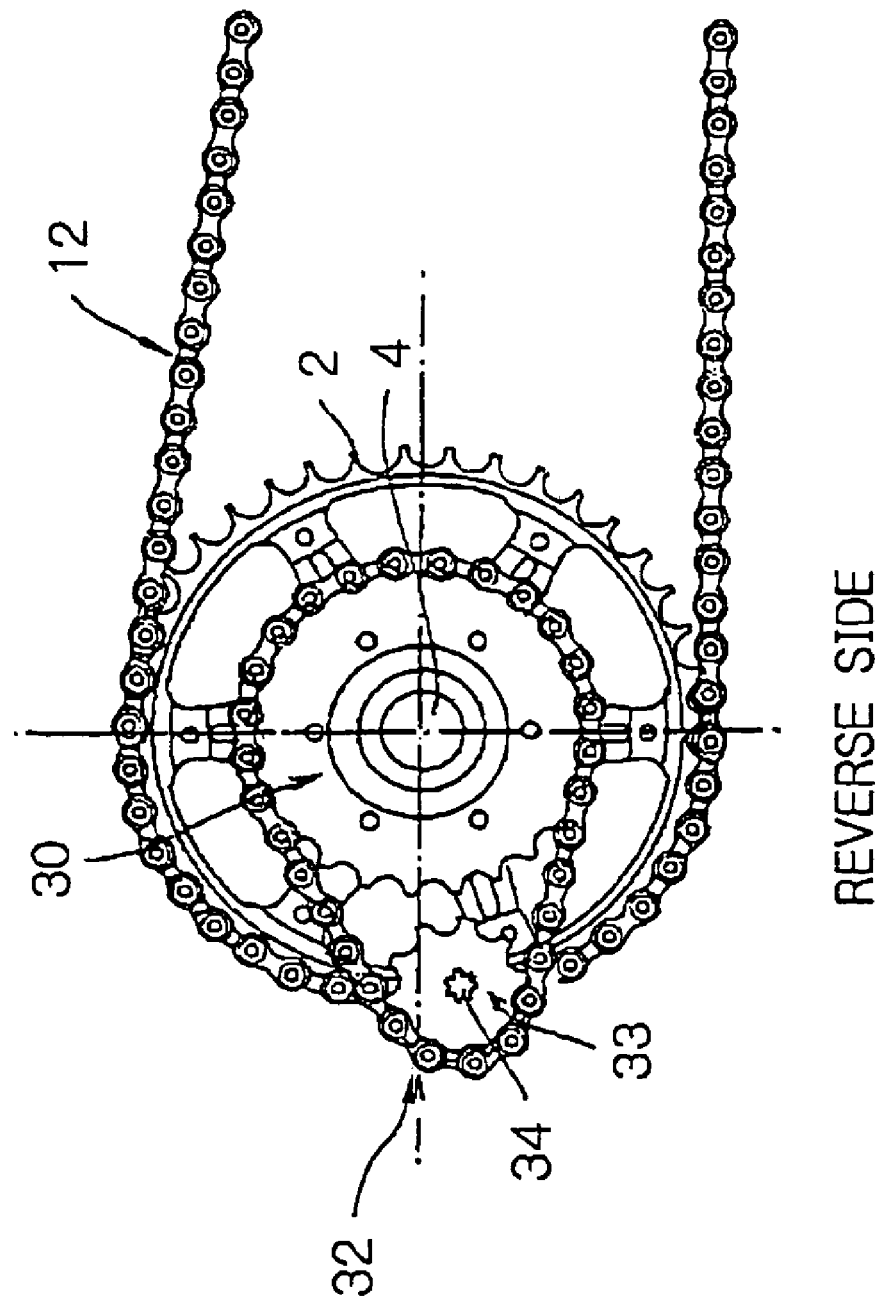
FIG. 6 is an enlarged front elevation view viewed from a reverse side of a primary sprocket for illustrating a force combining mechanism by a double chain system of an electromotive power assisted bicycle according to one embodiment of the present invention.

FIG. 6 shows an example of the force combining mechanism when the primary sprocket 2 is viewed from the reverse side thereof (the opposite side of FIG. 1). This force combining mechanism comprises a secondary sprocket 30 supported coaxially with the primary sprocket 2, a power sprocket 33 capable of being rotated by an assisting force to be output under a predetermined condition, and an assist chain 32 of endless rotation, which is stretched between the power sprocket 33 and the secondary sprocket 30 to transmit the assisting force from said power sprocket 33 to said secondary sprocket 30. The power sprocket 33 and the secondary sprocket 30 are equipped with the teeth arranged in the same pitch, wherein preferably the number of teeth of the power sprocket 33 is smaller than that of the secondary sprocket 30.

Since the force combining mechanism of FIG. 6 is disposed in the inner side of the body with respect to the primary sprocket 2, the secondary sprocket 30 and the power sprocket 33 do not protrude outward from the body, thus allowing the body to be made compact. Further, as illustrated, since a distance between the primary sprocket 2 and the power sprocket 33 can be made smaller than a radius of the primary sprocket 2, the entire force combining mechanism can be integrally formed in a low-profile unit. Owing to this, as shown in FIG. 7(*a*), if seen from the outside of the bicycle (i.e., from the front side), the force combining mechanism, in its majority portion, is hidden in the axially inner side of the primary sprocket 2, giving no fear of spoiling the exterior appearance. Installing a chain cover 38 over the primary sprocket 2 so as to hide the chain 12 provides protection for the chain as well as further improvement in the exterior appearance.

Figure 7:
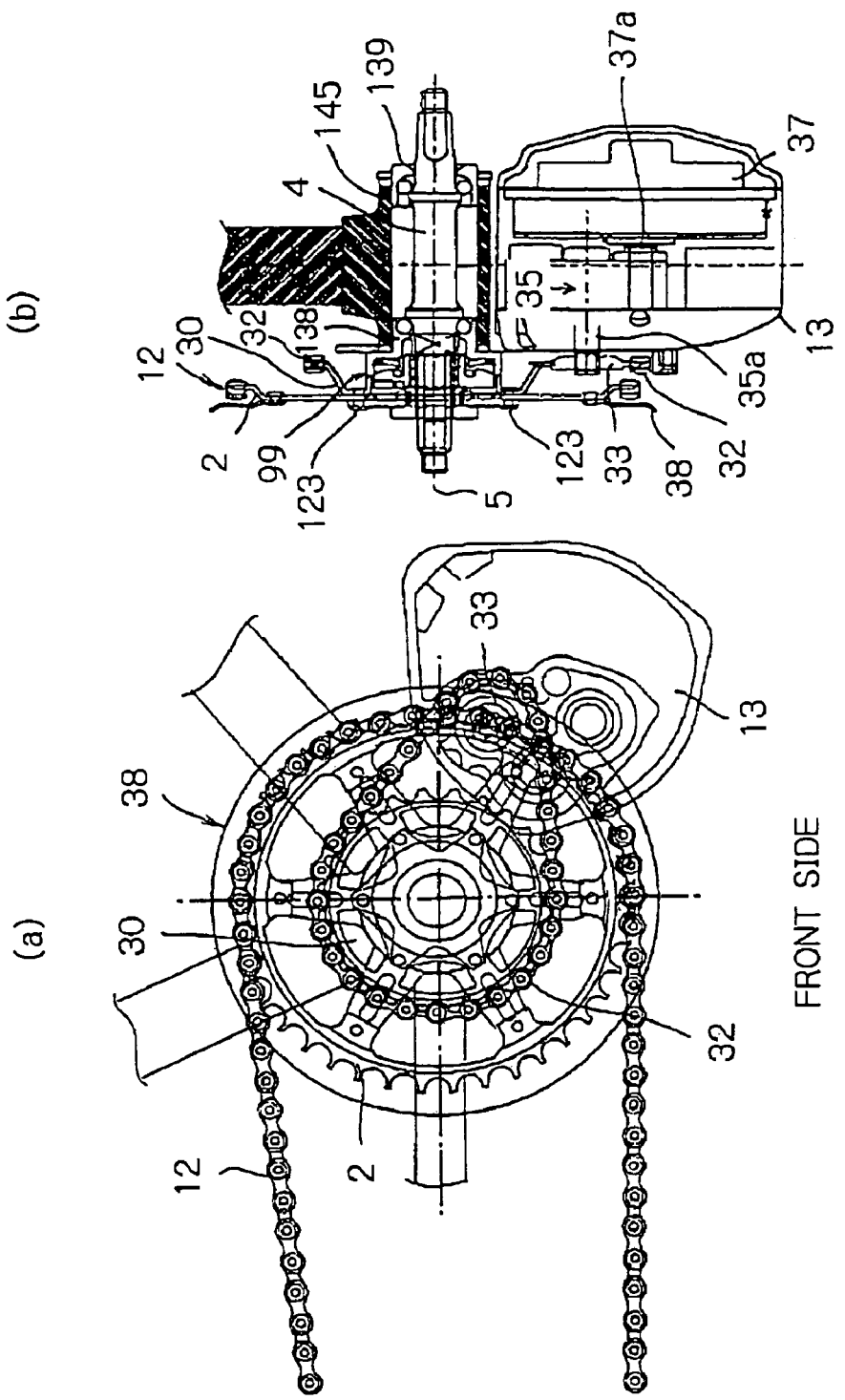
FIG. 7 is a diagram showing a force combining mechanism of an electromotive power assisted bicycle of the present invention, wherein (a) is an enlarged front elevation view thereof viewed from the front side of a primary sprocket and (b) is a cross sectional view thereof.
Figure 8:
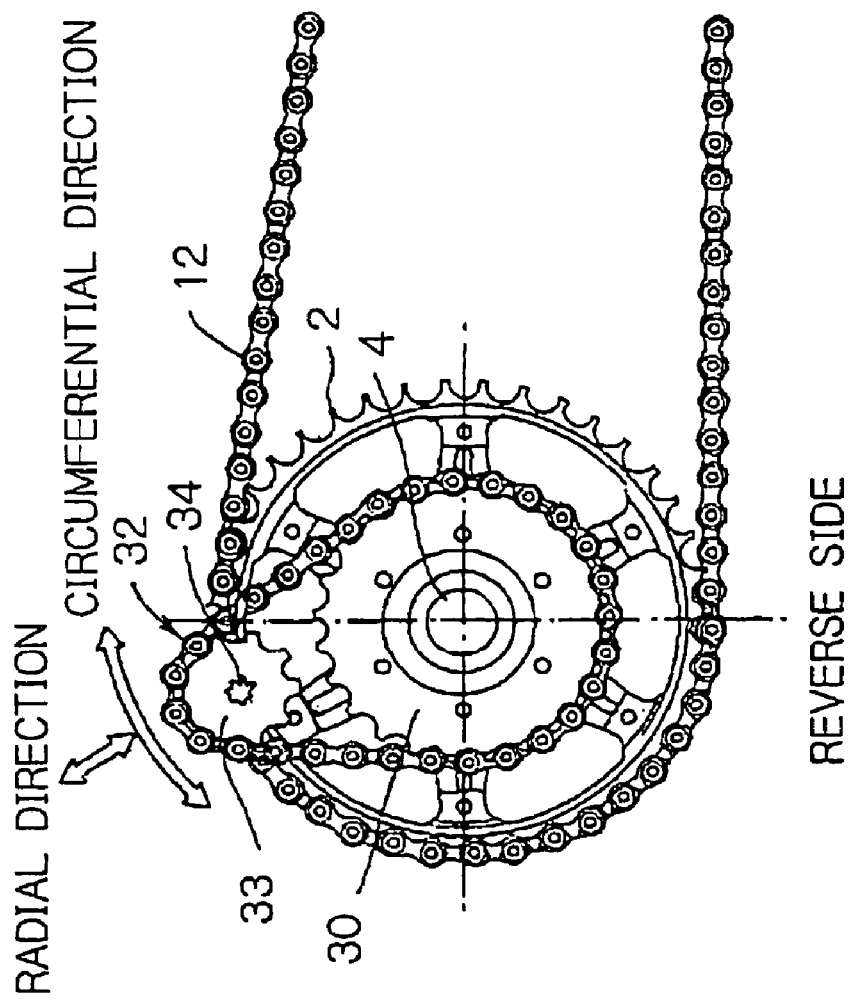
FIG. 8 is an enlarged front elevation view viewed from a reverse side of a primary sprocket for illustrating a force combining mechanism by a double chain system of an electromotive power assisted bicycle according to another embodiment of the present invention.

FIG. 7(*b*) shows a cross sectional view of FIG. 7(*a*) taken along a vertical line passing through the center of the primary sprocket 2. As illustrated in FIG. 7(*b*), the primary sprocket and the secondary sprocket 32 are fixed by pins 123 so that they do not move separately from each other (i.e., but rotate as one unit), and they are both coupled to a drive shaft 4 via a one-way clutch 99. The power sprocket 33 is operatively coupled to a drive unit 13 via a power shaft 35*a* extending in parallel with the drive shaft 4. By forming a serration (see FIGS. 6 and 8) in a center hole 34 of the power sprocket 33, a slipping rotation between the power shaft 35*a* and the center hole 34 can be prohibited.

The drive unit 13 is mounted to a frame similar to that of an ordinary bicycle, and its housing contains the above-described electric motor 37 and the speed reducing unit 35.

An operation of the force combining mechanism of the present embodiment will now be described.

When the electric motor 37 is controlled to rotate under a predetermined condition and the assisting force from it is provided to the power sprocket 33 via the speed reducing unit 35, the torque of the power sprocket is transmitted to the secondary sprocket 30 via the assist chain 32, which in turn is immediately transmitted to the main sprocket 2 that is fixed to said secondary sprocket 30 and designed to be rotated by the pedal effort. Thus, the combining of the assisting force and the pedal effort can be achieved.

When the electric motor 37 is not driven to revolve, a load necessary for revolving the motor 37 is prevented from being transmitted to the power sprocket 33 by said one-way clutch, not shown, disposed within the speed reducing unit 35, thereby allowing light riding of the bicycle.

Thus, the present embodiment employs a so-called double chain system, in which, differently from the prior art system, the assisting force is not directly transmitted to a chain 12 serving for transmitting the pedal effort but the assisting torque from the power sprocket 33 is transmitted via a separate chain 32 to the secondary sprocket 30 rotating along with the primary sprocket 2. Owing to this configuration, the degree of flexibility for installing the drive unit 13 can be extended broadly as compared to the prior art. For example, as shown in FIGS. 6 and 7(*a*), since the drive unit can be placed in the forward direction of the bicycle, therefore the drive unit 13 can be installed also in an ordinary bicycle frame, other than a dedicated frame that has been specially tailored for the electromotive power assisted bicycle.

It is a matter of course that the power sprocket 33 may be located in any location along a circumferential direction. FIG. 8 shows an example where the position of the power sprocket 33 has been offset by about 90 degrees clockwise in the circumferential direction. In that case, the drive unit 13 can be mounted to a support frame of a saddle 18 (FIG. 1). Further, by selecting the length of the assist chain 32, the position of the power sprocket 33 in the radial direction (i.e., a distance from the center of the primary sprocket 2 to the center of the power sprocket 33) can be also modified as desired to be further outer side or further inner side. Thus, a minimum ground clearance of the drive unit 13 can be made larger or smaller.

In this way, since the double chain system provides a great freedom for installation, any bicycle can be equipped with the electrical power system without any restriction otherwise imposed by the type thereof. In other words, the degree of flexibility of design can be greatly increased.

In addition, if the number of teeth of the power sprocket 33 is selected to be smaller than that of the secondary sprocket 30 as illustrated, then the force combining mechanism can independently provide the speed reduction system. Owing to this, the reduction ratio of the speed reducing unit 35 can be made small, and consequently the speed reducing unit can be made simple and small. Thus, in this embodiment, the degree of flexibility for the reduction ratio can also be extended.

Figure 3:
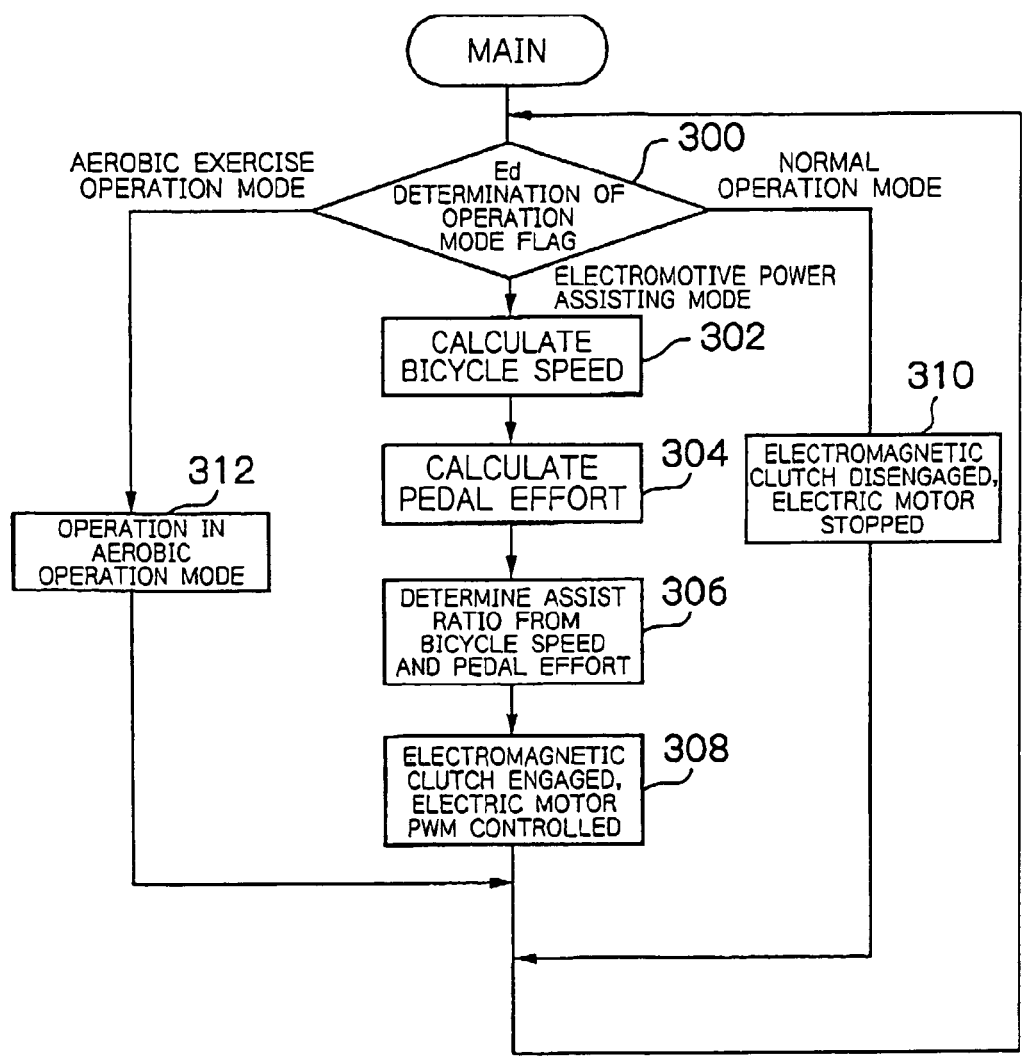
FIG. 3 is a flow chart showing a flow of a main control of an electromotive power assisted bicycle of the present invention.

A flow chart of FIG. 3 generally shows by way of example a flow of main processing by the 1-chip microcomputer 14 shown in FIG. 2. This main routine is repeated by a predetermined cycle.

As shown in FIG. 3, first of all, a determination is made on the operation mode flag Fd stored in a resister (Step 300). Depending on the code information of this operation mode flag Fd, the subsequent process is branched.

If the electromotive power assisting mode has been selected as a result from Step 300, the 1-chip microcomputer 14 calculates a bicycle speed "v" or a physical quantity relating thereto based on the input rotational speed signal (Step 302). Subsequently, the 1-chip microcomputer 14 calculates a pedal effort or a physical quantity "Pq" relating thereto based on a strain gauge signal from an arithmetic calculator 252 (Step 304). Then, based on the calculated bicycle speed and the pedal effort Pq, the 1-chip microcomputer 14 determines an assist ratio (electric force/pedal effort) or a control quantity relating thereto (Step 306). The determination of the assist ratio may be executed by, for example, referring to a look-up table defining a relation between each level of the bicycle speed and pedal effort and the control quantity for the assist. Then, the 1-chip microcomputer 14, under the state where the electromagnetic clutch 250 is engaged, applies a PWM (Pulse Width Modulation) control to the electric motor 37 to generate an assisting force corresponding to the determined assist ratio (Step 308). Specifically, the pulse signals that have been modulated to have pulse widths corresponding to said assisting force are sequentially output. As long as the operation mode flag Fd "electromotive assisting mode" is not rewritten, Steps 302 through 308 are continuously repeated.

If the normal operation mode has been selected in Step 300, the 1-chip microcomputer 14 disengages the electromagnetic clutch 250 and at the same time stops the electric motor 37 (Step 310). As long as the operation mode flag Fd "normal operation mode" is not rewritten, Step 310 is continuously repeated.

If the aerobic exercise mode has been selected in Step 300, an operation enabling the rider to perform an aerobic exercise is executed (Step 312). As long as the operation mode flag Fd "aerobic exercise mode" is not rewritten, Step 312 is continuously repeated.

A flow of a conceptual processing of the aerobic exercise mode operation will now be described with reference to the flow chart of FIG. 4.

First, the 1-chip microcomputer 14 calculates the pedal effort or the physical quantity Pq relating thereto based on the strain gauge signal from the arithmetic calculator 252 (Step 330). Subsequently, a heart rate "h" is detected based on the signal from the heart rate detection sensor 254 (Step 332). Then, a pedal effort level "Pr" enabling the rider to perform an aerobic exercise is set as a target of control (Step 334). For example, if the heart rate h is relatively high, the pedal effort level Pr may be set as low, while if the heart rate h is relatively low, the pedal effort Pr may be set as high. This step may be achieved by retrieving the table in which an ideal pedal effort level value for each heart rate has been stored.

Next, the Pq is compared with Pr to determine which is higher (Step 336).

If the detected pedal effort Pq is greater than the set pedal effort level Pr (i.e., Pq>Pr), then the electric force Te necessary for decreasing the pedal effort Pq to the Pr representative of the target value is calculated (Step 338). This electric force Te is a function of (Pq−Pr) (in the simplest case, a proportional function thereof). Then, under a condition where the electromagnetic clutch 250 is engaged, the PWM control is applied to the electric motor 37 so as to generate the electric force Te calculated in Step 338 (Step 340).

In contrast to this, if the detected pedal effort Pq is smaller than the set pedal effort level Pr in the determination from Step 336 (i.e., Pq<Pr), then a loading force "L" necessary for increasing the pedal effort Pq to the Pr representative of the target value is calculated (Step 342). This loading force L is a function of (Pr−Pq) (in the simplest case, a proportional function thereof). Next, the speed reducing unit 35 has its gear shifted to a reduction ratio necessary for achieving the calculated loading force (Step 344). Then, under the condition where the electromagnetic clutch 250 is engaged, the electric motor 37 is turned off to generate the loading force against the pedal effort (Step 346). It is to be noted that if the pedal effort Pq has not yet reached the Pr after a certain period has elapsed, the loading force may be further increased to thereby reduce the bicycle speed and to urge the rider to increase the pedal effort.

If the detected pedal effort Pq is substantially equal to the set pedal effort level Pr that has been detected in the determination of Step 336 (i.e., Pq=Pr), then the electromagnetic clutch 250 is disengaged and the electric motor 37 is turned off. In this way, the electric force or the loading force is not applied, but the operation only by the current pedal effort substantially equal to the set pedal effort level Pr is continued.

Figure 4:
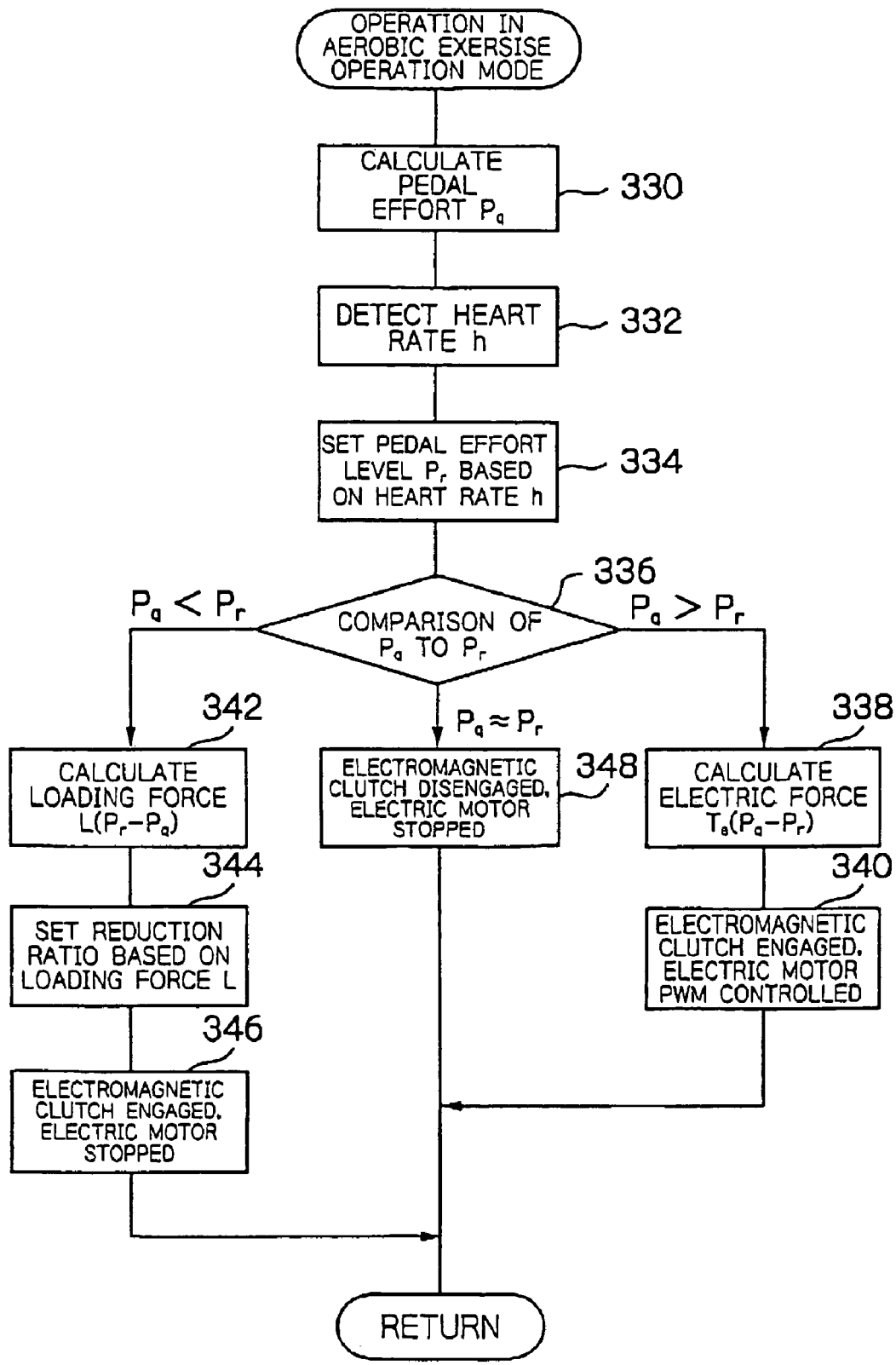
FIG. 4 is a flow chart showing a flow of a control during an operation in an aerobic exercise operation mode.

If either one of the branched processing described above ends, the process exits a sub-routine shown in FIG. 4 and returns to Step 300 of the main routine shown in FIG. 3 to repeat the same processing.

As described above, in the present invention, the drive unit 13 that has been configured as a single unit, in itself, can provide not only the electric force but also the loading force. Consequently, as compared to the prior art in which the loading unit has been embodied as a large scale braking system separate from the electromotive power unit, the present invention can simplify the entire mechanism of the electromotive power assisted bicycle 1 and reduce the weight thereof. Further, in conjunction with the advantage of employing said double chain system as the force combining mechanism, the present invention minimizes the need for fabricating the dedicated body frame and allows existing frame manufacturing processes to be utilized.

Further, when the bicycle is stopped at a traffic light or the like, in the prior art which has utilized the loading to be produced by the rotation of the rear wheel, the pedaling must be performed after the rear wheel is raised from the ground using a bipod stand or the like, which lacks a quickness in motion. However, since the present embodiment uses the rotational resistance of the electric motor as the loading force, and also the force combining mechanism by way of the double chain system or the like is employed, even during a period of no running (i.e., when the bicycle speed is zero) with the rear wheel in contact with the ground, if the bicycle body is held quickly so as not to fall down, using a mono-pod stand, and the pedaling is performed in an inverse direction, then the aerobic exercise can be continued during a stationary time under the condition where the loading is applied as it was (aerobic exercise during the stationary period).

An overview of the processes in the sub routine of FIG. 4 will be described more specifically with reference to FIGS. 17(a) and (b). As shown in FIG. 17(a), it is assumed that the electromotive power assisted bicycle 1 according to the present example runs on a road consisting of flat land "$r_1$", an upward slope "$r_2$", a peak flat land "$r_3$", a downward slope "$r_4$" and a flat land "$r_5$". At this time, as to the propulsive force required for running on respective road surfaces, an approximately constant value (set pedal effort level value) suitable for the aerobic exercise is exhibited on the flat land, $r_1$, $r_3$ and $r_5$, as illustrated. On the other hand, the propulsive force on the upward slope $r_2$ exhibits a maximum propulsive force value much higher than that on the flat land, while on the downward slope $r_4$, the propulsive force will exhibit a minimum value, zero. Thus, since the pedal effort Pq is approximately equal to the set pedal effort level value Pr for the running on the flat land, $r_1$, $r_3$ and $r_5$, neither of the electric force nor the loading force would be applied in this example. In contrast to this, since the pedal effort will be higher than the set level value for the running on the upward slope $r_2$, an excess thereof would be compensated by the electric force and said pedal effort would be lowered to a proximity to the set level value. On the contrary, since the bicycle could run downward even without any pedal effort applied, the loading force should be provided to thereby decrease the bicycle speed and to urge the rider to apply the pedal effort, as illustrated.

Thus, even during the running on the road including the upward slopes and downward slopes, the rider can run with an approximately constant pedal effort to thereby carry out the aerobic exercise appropriately.

In practice, the heart rate varies during the running, and FIG. 17(b) shows an example of control taking this fact into account. As illustrated, the variation in the heart rate is assumed such that the heart rate increases to a relatively high rate when running on the upward slope $r_2$ and it is approximately constant when running on the flat land $r_1$, $r_3$, $r_5$ and also on the downward slope $r_4$.

In the example of FIG. 17(b), the heart rate exceeds a threshold value "H" at the time "$t_1$" in the middle of the running on the upward slope $r_2$, and at this point, the control is provided such that the additional torque 260 determined based on the heart rate may be added to the electric force and loading force of FIG. 17(a). As a result, the pedal effort by the rider would have been decreased to a lower level than the previous one after the time "$t_1$" so as to prevent the heart rate from being increased any more. Thus, in the mode taking the heart rate into account, adequate aerobic exercise may be feasible, which is sequentially associated with the health condition of the rider or the difference in physical strength of each individual rider in the riding and the changes in the condition of the physical strength during the exercise.

Figure 5:
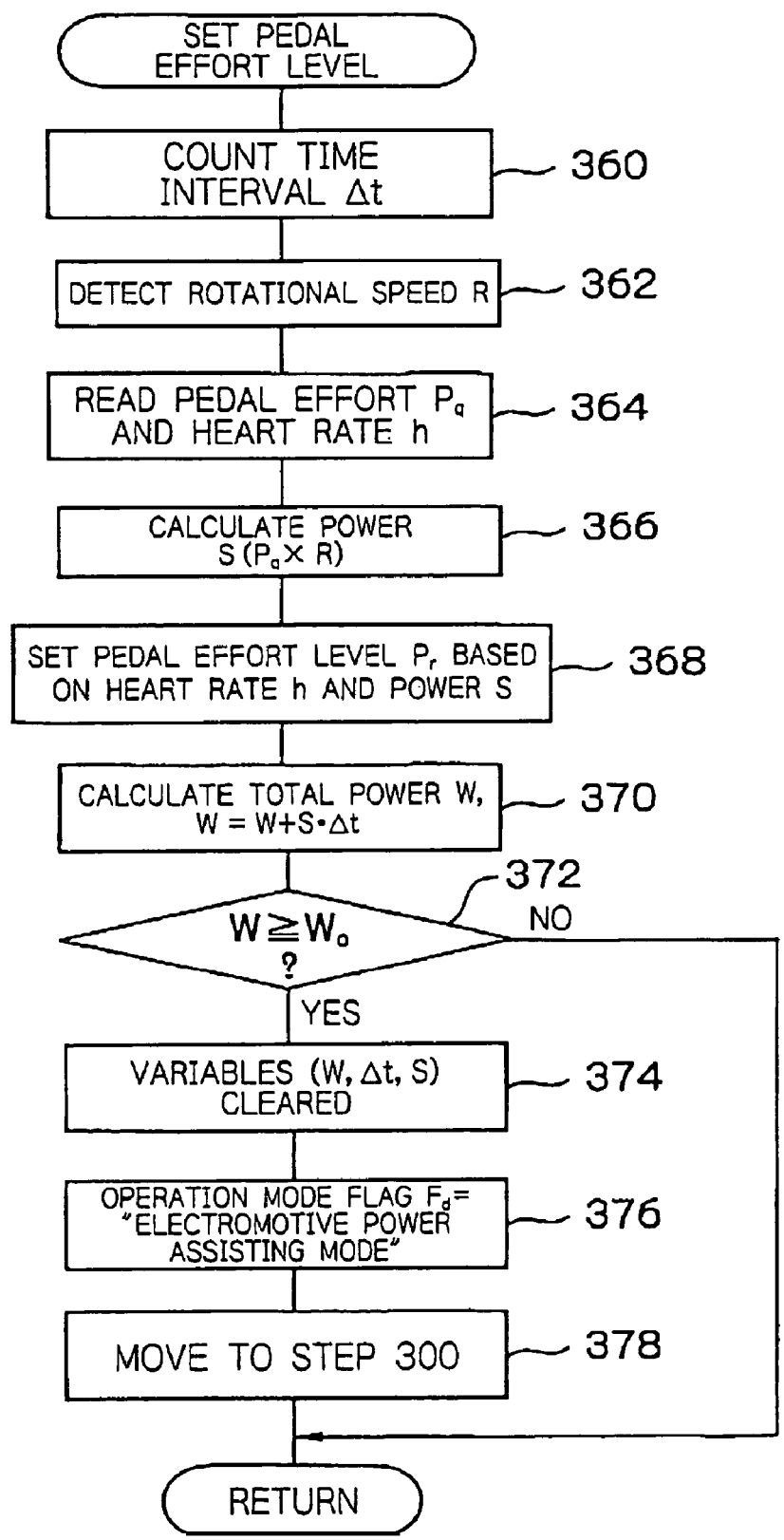
FIG. 5 is a flow chart showing a flow for setting a pedal effort level according to an alternative embodiment.

An alternative mode of Step 334 of FIG. 4 will now be described in detail with reference to the flow chart of FIG. 5. This serves for setting the pedal effort level in the viewpoint of the power as well as for managing the work load of the aerobic exercise.

Firstly, a time interval, "$\Delta t$", is counted (Step 360). The time interval $\Delta t$ is defined by the time interval between a point immediate before the process exits the sub-routine of FIG. 5 to a point when the process calls this routine next time, which represents a minute time period during which the pedal effort, the rotational speed and the like are considered to be almost constant.

Secondly, a rotational speed "R" of the drive shaft 4 is detected (Step 362), and the pedal effort "Pq" and the heart rate "h", which have been detected and stored in the memory in Steps 330 and 332 of FIG. 4, are read (Step 364). Subsequently, the power "S" by the pedal effort from the rider is determined as a product of the pedal effort Pq and the rotational speed R of the drive shaft 4 (or as a function thereof) (Step 366).

Next, the pedal effort Pr is set as a target of control based on the heart rate h and the power S (Step 368). For example, if the power S is relatively high, the pedal effort level Pr should be set lower, while if the power S is relatively low, the pedal effort level Pr should be set higher. The setting of the Pr in association with the heart rate h will be carried out similarly. This step can be achieved by retrieving a table containing an ideal pedal effort level value for each heart rate and power S.

Next, a total work load "W" that has been done by this point of time through the aerobic exercise is calculated (Step 370).

$$W = W + S \cdot \Delta t$$

Herein, the W has been initialized to 0 at the time of starting of the aerobic exercise, and the second term of the above equation is sequentially added each time this routine is repeated. In the above equation, from the assumption that the power S is almost constant during the time period of $\Delta t$ counted in Step 360, the second term, $S \cdot \Delta t$, can be considered to be a work done by the rider through the pedal effort.

Subsequently, it is determined if the work load W has reached a predetermined threshold value $W_0$ or higher (Step 372). Herein, the threshold value $W_0$ is considered an acceptable value for the aerobic exercise quantity, which may be appropriately set by the rider depending on the desired quantity of exercise or alternatively may be set automatically by the 1-chip microcomputer in response to the averaged heart rate of the rider. If the work load W is lower than the predetermined threshold value $W_0$ (by the negative determination in Step 372), the process exits this routine and the operation in the aerobic exercise mode shown in FIG. 3 may be continued.

When the work load W has reached the threshold value $W_0$ or higher (by the affirmative determination in Step 372), variables (W, $\Delta t$, S) is cleared (Step 374), the operation mode flag Fd is rewritten to the code of "the electromotive power assisting mode" (Step 376), and the process moves to Step 300 of FIG. 3 (Step 378). That is, when the total work load W of the aerobic exercise has reached the desired level, the operation is shifted to the electromotive power assisting mode.

The power S calculated in Step 366 can reflect the caloric expenditure more correctly as compared to a mere pedal effort (i.e., if the pedal effort is high but the rotational speed R is low, the caloric expenditure is not high, and if the pedal effort is low but the rotational speed R is high, the caloric expenditure is not low). Accordingly, the aerobic exercise can be performed in a proper manner by setting the pedal effort based on the power as shown in FIG. 5.

Further, since the work load of the aerobic exercise can be grasped, the above process can be applied to the case of performing the aerobic exercise by utilizing the opportunity of running on a designated road. For example, even if the work load is small on the designated road such as a school-commuting road or a commuting route, a shortfall may be supplemented by performing beforehand the aerobic exercise during the halting period described above.

Preferably, the 1-chip microcomputer 14 can execute checking of the remaining capacity of the battery regularly. If the remaining capacity of the battery is low, the 1-chip microcomputer 14 may instruct to charge the battery 17 with the motor electromotive force to be generated when the motor 37 is rotated by the pedal effort (Step 346, for example). Further, in the case where the aerobic exercise during halting is carried out, if the battery 17 is charged with the motor electromotive force, the effort in charging operation can be eliminated. At this time, the 1-chip microcomputer 14 determines the rotational direction of the pedal based on the signal from the rotational speed sensor 220, and shifts the connection mode between the battery 17 and the motor 37 by a relay, not shown, depending on the difference in the polarity of the motor electromotive force due to the difference in its rotational direction.

It is to be noted that, since in the 1-chip microcomputer 14 employed in the present embodiment, 1 unit of data or 1 unit of command is composed of 16 bits, the 1-chip microcomputer 14 is able to execute such a program having a higher level of processing function at a higher speed based on a larger scale of data volume as compared with the 8-bit microcomputer that has been typically used in the prior art electromotive power assisted bicycle. In this connection, in the present embodiment, the dedicated PWM control IC has been omitted, but the electronic processing of the above-described respective steps is performed in a batch processing by the 1-chip microcomputer 14, while at the same time, the PWM control such as those in Step 308, 340 is applied to the electric motor 37 directly. This PWM control may be achieved by software (including firmware) stored in a memory, not shown, of the 1-chip microcomputer 14.

Thus, the present embodiment allows for a single microcomputer, by using the 16-bit microcomputer with high processing capacity, to perform all the control tasks including, for example, the PWM control that is executed by using the dedicated IC in the prior art, yet without modifying the basic design by a great degree. Consequently, the number of parts and an area of substrate can be reduced as a whole, and this contributes to total cost reduction as well as miniaturization of the system. For example, a 16-bit microcomputer is generally more expensive than a 8-bit maicrocomputer, but if the PWM control dedicated IC, an IC for executing other electronic processing such as monitoring of a remaining capacity of an electric cell and their peripherals are combined with the 8-bit microcomputer as an additional functional means, the system of the 8-bit microcomputer would lead to a higher cost than the 16-bit microcomputer.

In addition, since the 16-bit microcomputer can execute a variety of processing with its software without trouble, a circuit can be made simple. Further, since a future enhancement in its function may be feasible in a similarly flexible way, from this point of view, the cost reduction can be possible. Further, since the electromotive power assisting condition can be always monitored by the software, the electric motor 37 can be suspended immediately in any circumstances.

[Rotational Speed Sensor]

A rotational speed sensor for outputting a rotational speed signal to be input to the 1-chip microcomputer 14 will now be described.

FIG. 9 shows an NS polarized ring magnet 200 as one of the components of the rotational speed sensor. This ring magnet 200 is formed generally into a flat ring having an opening 205 in its center. The ring magnet 200 comprises a plurality of magnet segments that divide the ring by an equal angle, and in those magnet segments, when viewed from the front side, N-pole segments 202 placed with their N-pole side facing front and S-pole segments 204 placed with their S-pole side facing front are alternately arranged. In that case, preferably the N-S poles of the magnet segments may be arranged, as shown in the side elevation view, such that the direction of magnetic flux may be substantially normal to the ring surface to achieve the condition where the opposite sides of the N-pole segments 202 are S-pole and the opposite sides of the S-pole segments 204 are N-polar. Although 12 magnet segments are arranged in the illustrated example, more or less magnet segments may be employed, which may be desirably and favorably modified according to a rotational speed of the object to be detected and a required detection accuracy.

It is to be noted that if there are normal components of the magnetic field with respect to the ring surface, then the orientation of the N-S pole of each magnet segment can be desirably and favorably modified. For example, one magnet may be placed along a circumferential direction so as to form adjacent N-pole segment and S-pole segment by respective poles of said one magnet. In that case, the opposite side of the N-pole segment will be N-pole, while the opposite side of the S-pole segment 204 will be S-pole, and it is considered from the viewpoint of the intensity of the magnetic field that the example of FIG. 9 is preferred.

FIG. 10 shows a gear 210 as the object whose rotational speed is to be detected. The gear 210 is rotated by the torque transmitted through the shaft 214 and a ring groove 208 is formed in one surface of the gear 210 to provide a size and shape sufficient to accommodate the ring magnet 200. The ring magnet 200 is accommodated in this ring groove 208 and affixed thereto by an adhesive or the like. At this time, preferably the ring magnet 200 and the surface of the gear 210 are flush to each other. This prevents the ring magnet from protruding beyond the gear surface and thereby minimizes the loss of space due to the installation of the rotational speed sensor.

Figure 11:
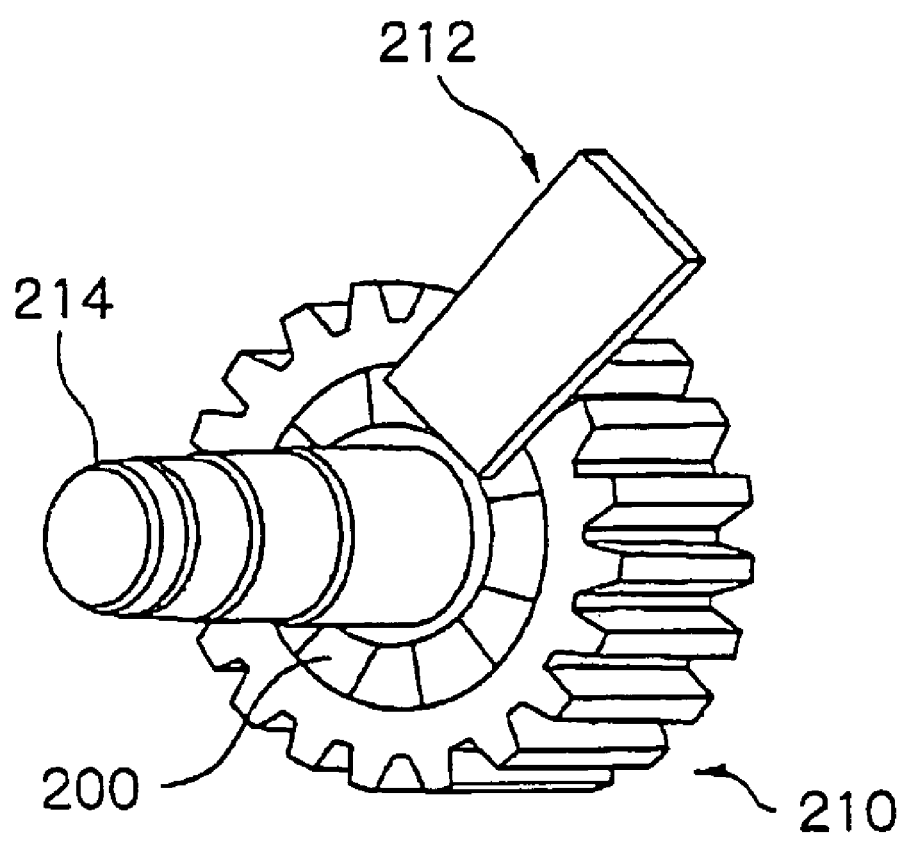
FIG. 11 is a perspective view of the rotational speed sensor of FIG. 10.

A Hall IC 212 for detecting the magnetic field is disposed adjacent to the ring magnet 200 installed in the gear 210. This Hall IC is a well-known magnetic field detecting IC that is equipped with a built-in element that can generate a resistance proportional to a current and a magnetic field in the normal direction to the current and the magnetic filed by the Hall effect when the magnetic field is present in the vertical direction with respect to the direction of the current flow within a semiconductor, and the Hall IC 212 also outputs a value of said resistance as a digital signal. An output terminal of the Hall IC 212 is connected to the 1-chip microcomputer 14. FIG. 11 shows the rotational speed sensor 220 of FIG. 10 represented in the perspective view.

The 1-chip microcomputer 14 may analyze the magnetic field detection signal (the rotational speed signal) from the Hall IC 212 in any desired and preferred method to detect the rotational speed of the gear 210. Herein, FIG. 12(*a*) shows one example of the magnetic waveform by the ring magnet 200 in a point of detection by the Hall IC 212. The Hall IC 212 detects such a variation in a magnetic field as shown in FIG. 12(*a*) and outputs a pulse signal shown in FIG. 12(*b*). The pulse signal of FIG. 12(*b*) corresponds in its timing to a local maximum portion of the N-pole side of the magnetic waveform of FIG. 12(*a*). In this case, the positive values (N-pole side) are exclusively extracted and the negative values (S-pole side) are deleted, but exclusively negative values or both the positive and negative values may be employed. The cycle of this pulse signal sequence (period between pulses) is proportional to the rotational speed of the ring magnet 200. Therefore, the 1-chip microcomputer 14 can detect a time interval of the pulse signal from the Hall IC 212 and determine the rotational speed of the ring magnet 200 and thus of the gear 210 immediately.

It is a matter of course that a magnetic field sensor other than the Hall IC, for example, a coil or the like, may be used, as long as it is capable of detecting the magnetic field. In this case, the output from the magnetic field detection sensor will appear to be such an analog waveform as shown in FIG. 12(*a*), and the 16-bit 1-chip microcomputer 14 is further added with a function for detecting, for example, a zero intersection point of the magnetic field signal (the time at the point of zero magnetic intensity), a peak in the N-pole side, or a peak in the S-pole side and for determining those times. Since the peak in the N-pole side 222 and the peak in the S-pole side 224 shown in FIG. 12(*a*) indicate the points when the poles of maximum magnetic intensity of the N-pole segment and the S-pole segment have passed through the detection area of the magnetic field sensor, the time period "T" necessary for the gear 210 to make one revolution can be detected from the count of occurrences of respective peaks and the times thereof. Thus, the rotational speed ($2\pi/T$) of the gear 210 can be determined immediately.

It is a matter of course that the rotational speed of the gear may be determined each time it is rotated by a predetermined angle, which is a part of a full revolution.

Since the rotational speed sensor of the present embodiment includes the NS polarized ring magnet 200 that has been formed in the flat ring shape, it can achieve a low profile and thus a space-saving and lightweight rotational speed sensor. Further, since it has a very simple structure, the fabrication thereof may be easy and thus the cost therefore may be reduced.

Further, since a plurality of magnetic segments has been integrated into a single flat ring, the assembling operation to a carrying component may be very easy. For example, as shown in FIG. 10, a ring groove is cut in the surface of the gear 210 and the ring magnet is simply embedded and secured therein with an adhesive or the like. As compared to the procedure of embedding each one of discrete magnets representing respective poles, the above operation can improve working efficiency significantly. Furthermore, if the depth of the groove is matched with the height of the ring magnet, then there will be no protrusion to the outside, contributing to the space saving.

Further, the time resolution of the rotational speed can be improved by reducing the angular range occupied by each magnetic segment.

The rotational speed sensor 220 can be mounted to a desired portion to be detected, which is rotated so as to reflect the running speed of the electromotive power assisted bicycle 1. As for this portion to be detected, a gear (not shown) within the speed reducing unit 35 operatively coupled with the power sprocket 33 directly or indirectly via another gear may be preferred because it allows for the rotational speed sensor 220 to be accommodated in the housing of the drive unit 13. It is to be noted that in the processing shown in FIG. 5, since the rotational speed of the crank shaft 4 has to be always detected regardless of the engagement or disengagement of the electromagnetic clutch, preferably the crank shaft 4, the sprocket 2 or the secondary sprocket 30 may be employed as a part to be detected.

Other locations may include, for example, a gear, not shown, disposed within a rear wheel power transmission mechanism 10, the power sprocket 33 and a revolving portion of a front wheel. The 1-chip microcomputer 14 may have a look up table used for converting the rotational speed of the portion to be detected which has been determined as described above into the running speed of the electromotive power assisted bicycle 1.

[Pedal Effort Detection Mechanism]

A pedal effort detection mechanism which outputs strain gauge signals 1, 2 to be input to the 1-chip microcomputer 14 will now be described with reference to FIGS. 13 through 16. The pedal effort detection mechanism according to the present embodiment detects a strain which varies in association with a deformation of the one-way clutch 99 in response to a pedal effort.

Figure 13:
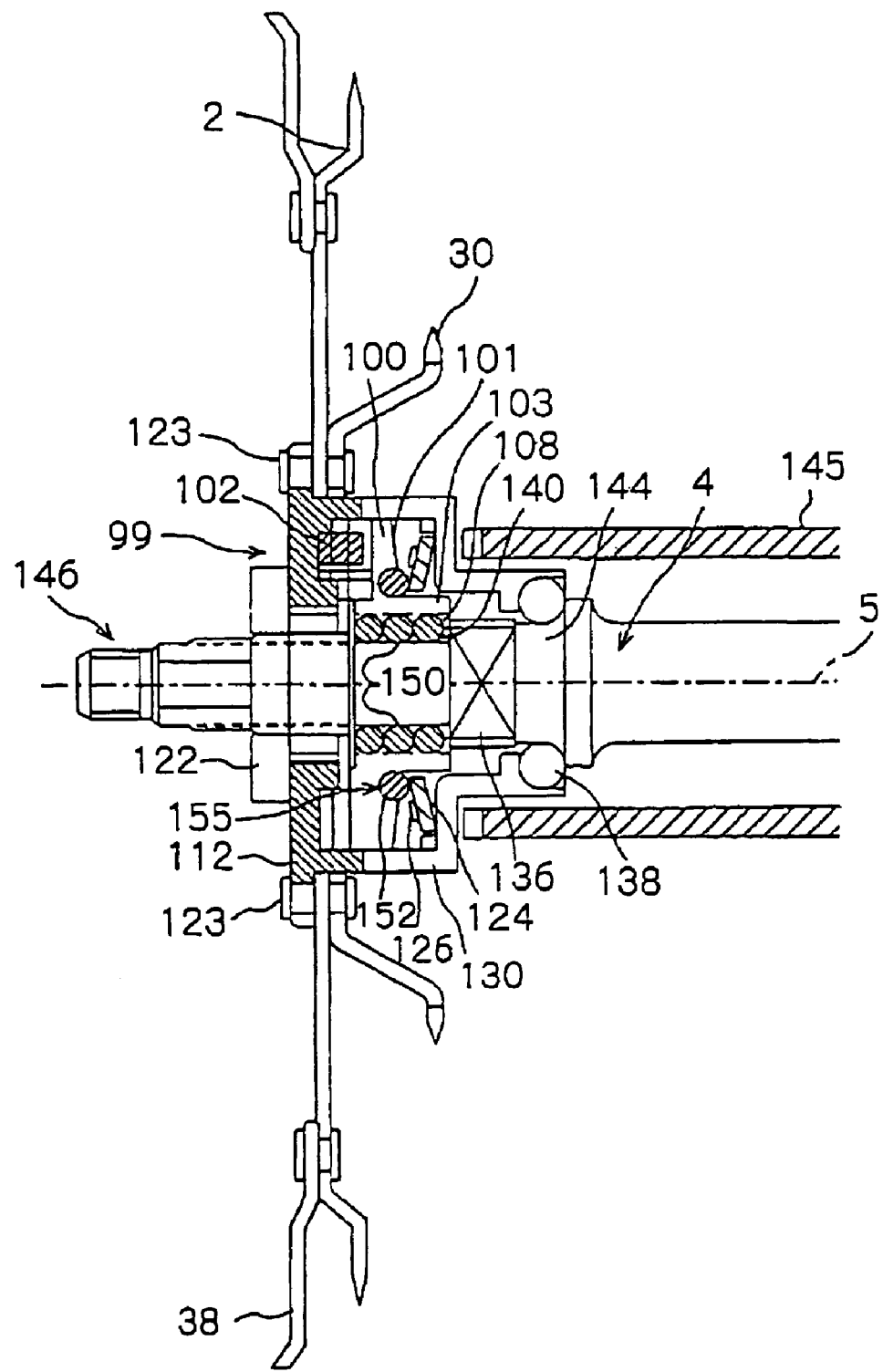
FIG. 13 is a cross sectional view around a drive shaft including a one-way clutch embodying a pedal effort detection mechanism of an electromotive power assisted bicycle of the present invention.
Figure 14:
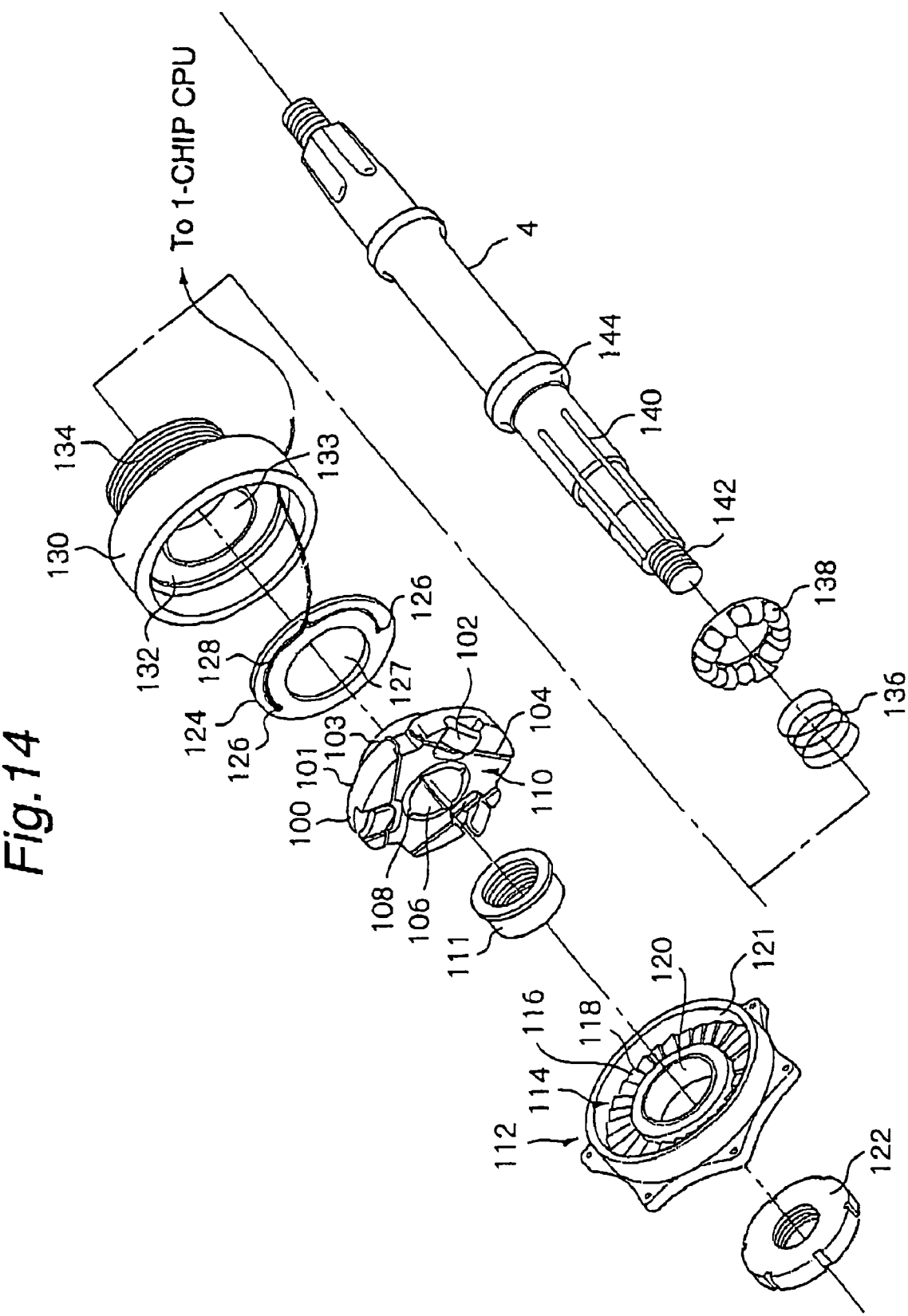
FIG. 14 is an exploded perspective view of the one-way clutch shown in FIG. 13.

As shown in FIG. 13, the primary sprocket 2 is supported by the drive shaft 4 via the one-way clutch 99. This one-way clutch 99 comprises a pawl member 100 and a tooth member 112, as shown in FIG. 14.

Figure 15:
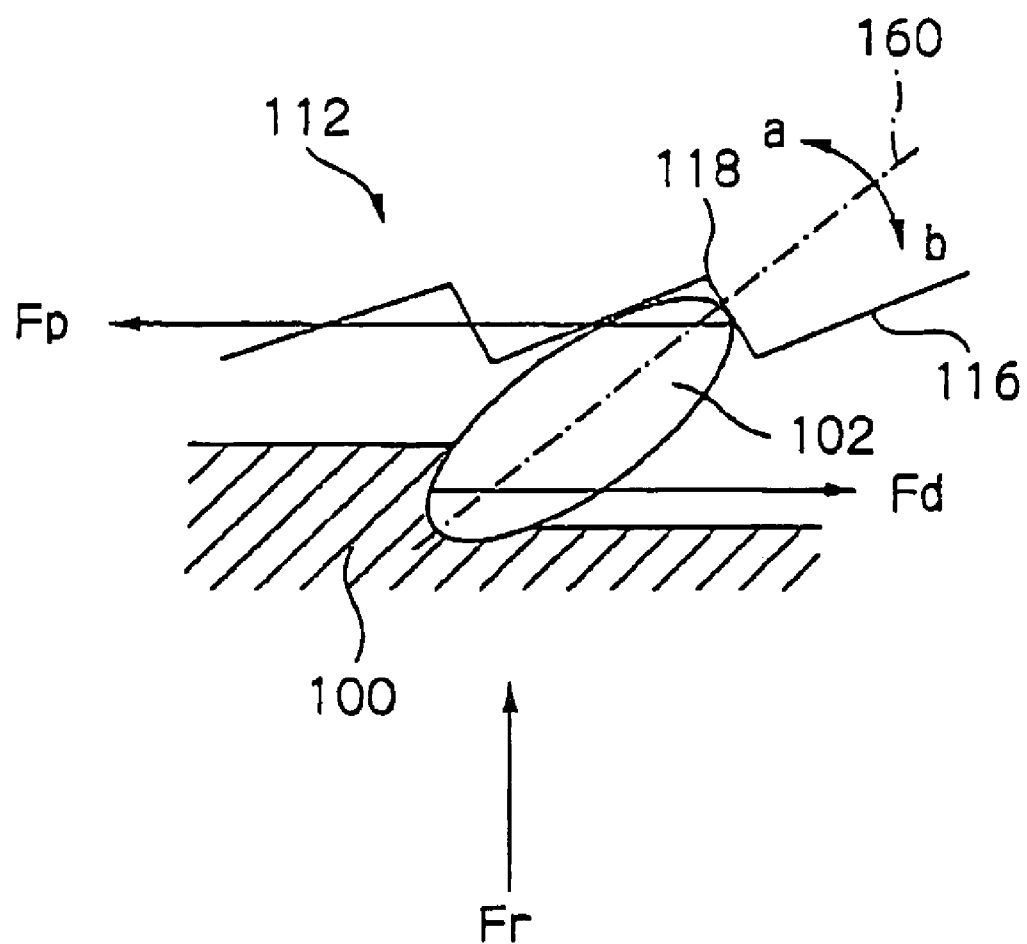
FIG. 15 is a diagram showing an engaged state of a tooth and a pawl of the one-way clutch (ratchet gear) for illustrating a principle of detecting the pedal effort of an electromotive power assisted bicycle of the present invention.

In the pawl member 100, three ratchet pawls 102 are arranged on a second engaging surface 100 along the circumference spaced apart by an angle of equal degrees. The ratchet pawls 102 are made of rigid material and configured to be capable of rotating around the shaft extending approximately along the radial direction of the second engaging surface 110. Each ratchet pawls 102 is biased by a pawl erecting spring 104 so that a longitudinal direction of the ratchet pawls may form a predetermined angle with respect to the engaging surface 110 (a balancing direction 160 of FIG. 15) when no force is applied to the ratchet pawls 102. As shown in FIG. 15, when the ratchet pawl 102 is deviated from the balancing direction 160 to an ascending direction "a" or a descending direction "b", the erecting spring 104 exerts a slight elastic force to the ratchet pawl 102 so as to cancel the deviation and to return it to the balancing direction 160.

Further, in the central area of the pawl member 100 is formed a pawl member bore 106 for receiving the drive shaft 4, and this pawl member bore 106 penetrates through a cylindrical portion 103 protruding from a back surface 101 of the pawl member 100. In the back surface 101, a circular groove 155 (FIG. 13) is formed on the outer surface of the cylindrical portion 103, and a number of steel balls 152 are fitted therein so as to rotate freely. This constructs a bearing serving for receiving an axial load as well as serving as a sliding bearing.

A coned disc spring 124 is brought into contact with the back surface 101 of the pawl member 100 with the cylindrical portion 103 passed through the center hole 127 thereof. At this time, the coned disc spring 124 is in slidable contact with the back surface 101 via the steel balls 152 or the load carrying bearing in a direction allowing for an elastic force of the coned disc spring 124 to resist against the pressure from the pawl member 100. Strain gauges 126 are attached onto the surface of the coned disc spring 124 at two locations opposite each other by 180 degrees. The strain gauges 126 are electrically connected to the 1-chip microcomputer 14 via a lead 128. More preferably, three or more strain gauges may be attached onto the coned disc spring 124. At this time, it is preferred that a plurality of strain gauges is disposed such that they are in rotationally symmetrical positions, on the surface of the coned disc spring 124.

The coned disc spring 124 is accommodated in the inner bottom portion 132 of a bowl-shaped supporter 130. In the supporter 130 are formed a support bore 133 allowing for the drive shaft 4 to pass through and a supporting cylindrical section 134 protruding from the back surface of the supporter 130. The outer surface of the supporting cylindrical portion 134 is threaded, so that the supporter 130 can be fixedly secured to the body by thread-engaging said threaded portion with the threaded inner wall of the support section 145. The inner wall of the supporting cylindrical portion 134 is engaged with a bearing 138 adaptable to support the load both in the axial direction and in the radial direction (see FIG. 13), and the bearing 138 is also supported by a stopper inclined plane 144 formed in the drive shaft 4. Similarly, another bearing 139 is mounted on the other side of the drive shaft 4 (see FIG. 7(b)), so that the drive shaft 4 may be rotatably supported with respect to the body.

Four of the first anti-rotation grooves 108 extending in the axial direction are formed on the inner wall of the pawl member bore 106. Also, four of the second anti-rotation grooves 140 extending in the axial direction 5 so as to face to the first anti-rotation grooves 108 are formed on the outer wall of the driving shaft 4 to be in slidable contact with the inner wall of the pawl member bore 106. As shown in FIG. 16(a), the first anti-rotation grooves 108 and the second anti-rotation grooves 140 facing thereto define cylindrical grooves extending along the axial direction, and a number of steel balls are contained in each cylindrical groove to thus fill the groove. Owing to this, the pawl member 100 can move along the axial direction 5 with a minimized frictional resistance, while preventing the relative rotation to the drive shaft 4. This constructs a kind of ball spline, and the ball spline of other types, including, for example, the ball spline of endless rotation type, may be applied as such an anti-rotation means capable of sliding.

Figure 16:
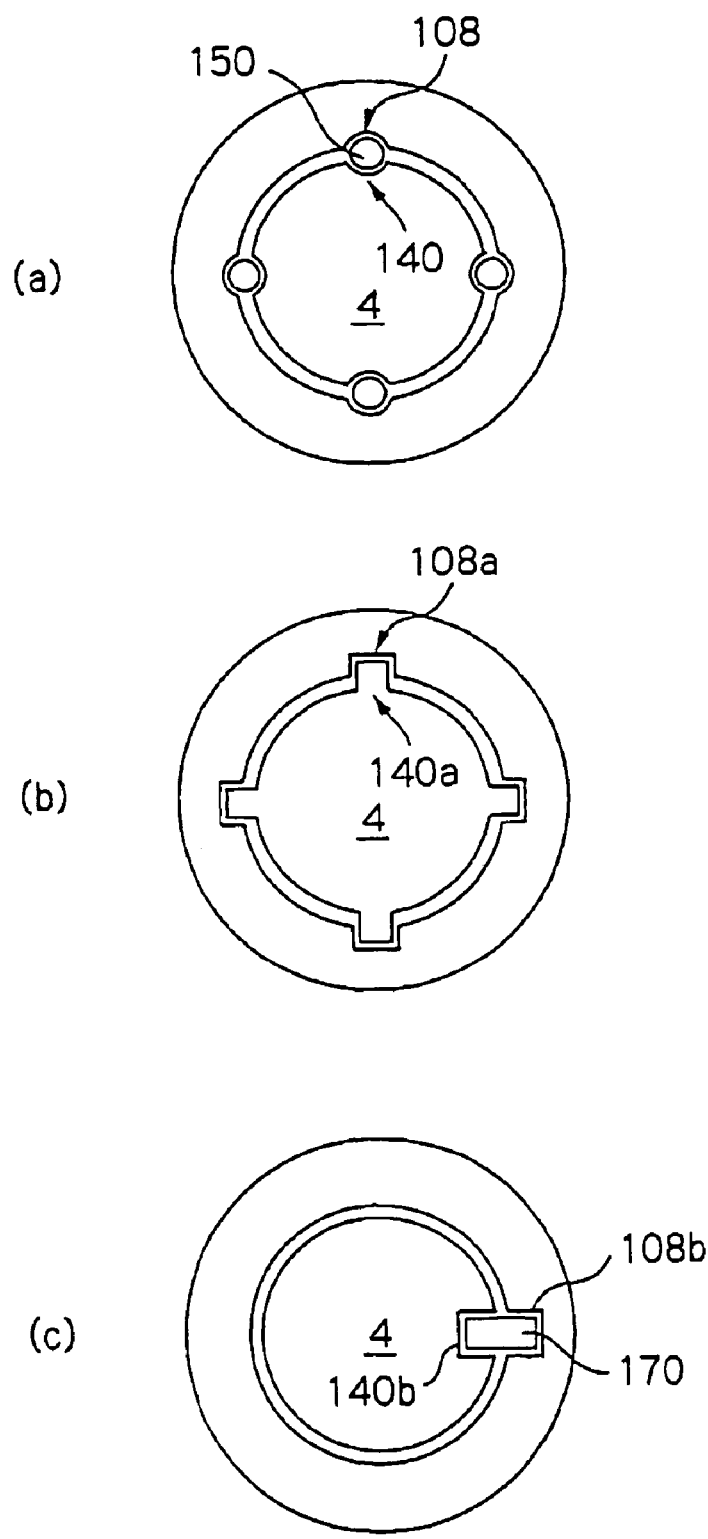
FIG. 16 is a diagram showing an example of an anti-rotation means for inhibiting the relative rotation of the pawl with respect to the drive shaft, wherein (a) is a top plan view of general configuration of a ball spline, (b) of a spline key and (c) of a key slot, respectively.

Further, as to the method for coupling the pawl member 100 to the drive shaft 4, a means other than the ball spline of FIG. 16(*a*) may be employed. For example, such a system as shown in FIG. 16(*b*), or a so-called key-spline system may be applicable as the anti-rotation means, in which the protrusion 140*a* extending in the axial direction is formed on the drive shaft 4, and a third anti-rotation groove 108*a* for accommodating the protrusion 140*a* is formed in the pawl member 100. Alternatively, in FIG. 16(*b*), the protrusion 140*a* may be formed in the pawl member 100 side and the third anti-rotation groove 108*a* may be formed in the drive shaft 4 side. Further, such a system as shown in FIG. 16(*c*), or a so-called key-groove system may be applicable as the anti-rotation means, in which a fourth anti-rotation groove 108*b* extending in the axial direction and a fifth anti-rotation groove 140*b* facing thereto are formed in the pawl member 100 and the drive shaft 4, respectively, and the key plate is contained in the groove in the rectangular parallelepiped shape formed by those grooves.

A plurality of ratchet teeth 114 are formed on a first engaging surface of the tooth member 112, which are to be engaged with the ratchet pawl 102. The ratchet teeth 114 comprise relatively sharply inclined planes 118 and relatively moderately inclined planes 116 with respect to the first engaging surface 121, which are formed alternately in a cyclic manner along a circumferential direction of the tooth member.

The tooth member 112 is supported by the drive shaft 4 via a collar 111 so as to be in slidable contact therewith in such a manner that its first engaging surface 121 may face the second engaging surface 110 of the pawl member 100. At this time, the ratchet pawl 102 and the ratchet tooth 112 are engaged to each other (FIG. 15). Specifically, the drive shaft 4 is operatively coupled to the tooth member 112 exclusively via the engaging portion between the ratchet pawl 102 and the ratchet tooth 112. The end portion 142 of the drive shaft 4 having passed through the tooth member bore 120 via the collar 111 is mated with a washer 122 to prevent the tooth member 112 from being shifted outwardly in the axial direction (FIG. 13). The tooth member 112 is attached with the primary sprocket 2 by the pin 123 (FIG. 13) so as to prevent the relative movement therebetween, and further the top end of the drive shaft 4 is formed into a pedal shaft 146. Thus, the ratchet gear is completely built, and serves for coupling the drive shaft 4 and the primary sprocket 2 so as to transmit exclusively the rotation by the force on the pedals in the forward direction of the body to the primary sprocket 2.

Preferably, a bias spring 136 is interposed between the stopper inclined plane 144 of the drive shaft 4 and the back surface 101 of the pawl member 100. This bias spring 136 forces the pawl member 100 to be biased in the axial direction so as to produce a clearance between the steel balls 152 accommodated in the back surface 101 and the coned disc spring 124 when the pedal effort is not greater than a predetermined value (for example, substantially proximal to zero).

An operation of the pedal effort detecting mechanism will now be described.

As a rider applies a pedal effort to the pedals 8R, 8L to rotate the drive shaft 4 in the direction forwarding the body, this rotational driving force is transmitted to the pawl member 100 supported operatively by the drive shaft such that it can not rotate but can slidably move with respect to the drive shaft 4. At that time, as shown in FIG. 15, since the ratchet pawl 102 is applied with a force "Fd" corresponding to the pedal effort from the pawl member 100, the top end thereof is brought into contact with the relatively sharply inclined plane 118 of the ratchet teeth of the tooth member 112, thereby attempting to transmit this force to the ratchet teeth. Since the ratchet tooth member 112 is coupled to the primary sprocket 2, the top end of the ratchet pawl 102 receives a force Fp generated from the load for the driving from the relatively sharply inclined plane 118. The ratchet pawl 102 that has been applied from its both end portions with the force Fp and the force Fd, which are acting in the opposite directions to each other, is rotated in the "a" direction to be elected. At this time, the pawl 100 is moved axially inward by the erection of the ratchet pawl 102 to press down the coned disc spring 124 disposed between the pawl member 100 and the supporter 130. The coned disc spring 124, in resistance to this, exerts an elastic force "Fr" to the pawl member 100. This force Fr and the force caused by the pedal effort to move the pawl member 100 in the axial direction are balanced within a short time. Thus, each of those parameters, including the stress-strain of the coned disc spring 124, the clearance between the pawl member 100 and the tooth member 112, the angle of the ratchet pawl 102 with the second engaging surface 110, the position of the pawl member 100 with respect to the body frame and a pressure applied to press down the coned disc spring 124, represents a physical quantity reflecting the pedal effort. Accordingly, the pedal effort T can be estimated by detecting at least one of those parameters.

In the present embodiment, the strain caused by the stress (hereinafter referred to simply as "strain") of the coned disc spring 124 will be detected by way of example. The 1-chip microcomputer 14 executes an arithmetic operation at least by an addition (including an averaging) on the signals from the two strain gags 126 attached onto the coned disc spring 124. In this way, measuring and averaging over the amounts of the strain at a plurality of locations may allow for the output variation to be extended even with the same level of pedal effort and also allow for the noise components to be smoothed, and so the SN ratio can be improved and further an estimation accuracy of the pedal effort can be improved. This effect will become greater as the number of strain gauges increases.

For a pedal effort not higher than a predetermined value, since the bias spring 136 produces a clearance between the back surface 101 of the pawl member 100 and the coned disc spring 124, the steel balls 152 impinge less frequently upon the coned disc spring 124. Owing to this, the noise components in the strain gauge signals are reduced and thus the stability in the pedal effort detection and also in the electromotive power assisting control can be improved.

Subsequently, the 1-chip microcomputer 14 executes an arithmetic operation to determine an assisting force "Te" to be applied for assistance based on at least the calculated operating force T, and arithmetically determines and outputs a control signal to instruct the electric motor 37 to supply a rotational driving force for said assisting force. Preferably, the 1-chip microcomputer 14 converts the rotational speed signal detected by the rotational speed sensor 220 into a speed of the bicycle, determines an appropriate assisting force Te based on both the pedal effort T and the bicycle speed, and controls the electric motor 37 to generate said assisting force Te.

The pedal effort detection mechanism of the present embodiment can bring about further superior effects as follows:

(1) Since the ratchet gear and the pedal effort detection mechanism have been realized in a single mechanism, reduction in the number of parts, compact arrangement, weight saving and low cost of the mechanism can be realized.

(2) Since the coned disc spring that is an integrated form of the load receiving unit and the load detection sensor is used in the portion serving for detecting the pedal effort and thus two functions have been realized by the single unit, in addition to the above-stated effects, further compactness, weight saving and low cost thereof can be achieved.

(3) Since the compactness, weight saving and simplification of the pedal effort detection mechanism has been achieved at a higher level, as indicated in the above clauses (1) and (2), an allowable range of application of the pedal effort detection mechanism to be installed has been further extended.

(4) For the reasons defined in the above clauses (1) and (2), the transmission loss of the load can be reduced as compared to the traditional mechanism, thereby realizing an assist feeling of good response in the control.

(5) For the reasons defined in the above clauses (1) and (2), idle motions of the pedal (time lag until being sensed by the sensor) have been successfully eliminated as compared to the traditional mechanism (using the coil spring), and the pedal feeling at the time of applying the pedal effort in the present embodiment has been made similar to that of an ordinary bicycle, in contrast to the spongy pedal feeling in association with the traditional mechanism.

The preferred embodiments of the present invention have been described above, but the present invention is not limited to those examples and may be modified desirably and preferably within the scope of the concept of the present invention.

For example, although the above example has been directed to an application for aerobic exercise, the electromotive power assisted bicycle of the present invention may have a muscle training mode added, in which the electric force may be reduced or eliminated and the loading force may be further increased. Yet further, the electromotive power assisted bicycle of the present invention may be employed to support physical strength recovery or physical therapy of a rider and so on, including such possible applications that heart rates are previously stored in the memory, and the pedal effort level may be set later under instructions from a physician, and that the heart rates are sent to a management center of a hospital and the like by using radio signals, and they are utilized under the management of a physician.

Although the pedal effort level has been set in response to the heart rate in the example of FIG. 4, alternatively or additionally to this, the pedal effort level may be set based on other parameters of a human body, such as a blood pressure.

Further, although the loading force during the aerobic exercise mode has utilized the rotational resistance of the electric motor 37, the loading force is not limited to this, but a loading force generation means, such as a brake, may be separately arranged within the drive unit 13. Further, although the adjustment of the loading force has been provided through the gear ratio adjustment, it may be provided through the adjustment of a duty ratio of engaging to disengaging of the electromagnetic clutch.

Further, although the double chain system has been used as the force combining mechanism, the present invention is not limited to this, but, for example, in addition to the main sprocket 2, the power sprocket 33 may be directly engaged with the chain 12.

Furthermore, the flow of processing in the main flow chart (FIG. 3) and in the flow chart for the aerobic exercise mode (FIGS. 4 and 5) may be appropriately modified. For example, to control such that the actual pedal effort may fall in a range generally matching the pedal effort level Pr of target, a so-called PID control may be employed.

Although not shown, a display function of the power and the work load may be provided.

As for the torque detection mechanism, which one of the pawl or the tooth member of the one-way clutch 99 should be attached to the sprocket and which the other should be attached to the drive shaft may be desirably and preferably modified. In one example, the pawl member 100 may be installed in the sprocket side, while the tooth member 112 may be operatively installed in the drive shaft so as to be slidable but un-rotatable with respect to the shaft such that the coned disc spring 124 may be pressed down by the tooth member 112.

Further, in the above example, the strain of the coned disc spring has been detected as a physical quantity in association with the pedal effort, but the present invention is not limited to this, and any physical quantity produced in the one-way clutch 99 may be detected therefore as long as it may vary in response to a deformation corresponding to the applied pedal effort. For example, the tilting angel of the ratchet pawl, the relative distance between the ratchet pawl member and the ratchet tooth member, the position of either one of the ratchet pawl member and the ratchet tooth member with respect the body, and the pressure applied to press the coned disc spring may be selected as the physical quantity reflecting the pedal effort.

Further, the elastic member arranged so as to resist the deformation of the one-way clutch 99 may be desirably and preferably modified in its type and shape. Other than the coned disc spring or the coil spring, for example, a rubber elastic member may be used. Still further, although the strain gauge has been employed as the means for detecting the strain, the means is not limited to this but any means may be employed as far as it can detect the physical quantity in association with the strain.

The invention claimed is:

1. An electromotive power assisted bicycle capable of running by a pedal effort that is assisted with an electric force, said bicycle comprising;

a pedal effort detection means for detecting a pedal effort, an auxiliary power means capable of selecting either one of an electric force or a loading force based on the pedal effort detected by said pedal effort detection means and also capable of adding said selected one to the pedal effort so as to yield a pedal effort level enabling an aerobic exercise, and a force combining means for combining said electromotive power or said loading force which has been selectively output by said auxiliary power means with said pedal effort, the force combining means comprising a secondary sprocket capable of rotating coaxially with a primary sprocket, a power sprocket to be rotated by said auxiliary power means, and an assist chain stretched between said secondary sprocket and said power sprocket, wherein said auxiliary power means includes an electric motor; and an electromagnetic clutch is provided between said electric motor and said force combining means, and wherein said loading force is provided as a rotational resistance of said electric motor, which is generated by connecting said electric motor with said force combining means by said electromagnetic clutch under a condition where said electric motor is not supplied with an electric power.

2. An electromotive power assisted bicycle capable of running by a pedal effort that is assisted with an electric force, said bicycle comprising:

a pedal effort detection means for detecting a pedal effort, an auxiliary power means capable of selecting either one of an electric force or a loading force based on the pedal effort detected by said pedal effort detection means and also capable of adding said selected one to the pedal effort so as to yield a pedal effort enabling an aerobic exercise, and a force combining means for combining said electromotive power or said loading force which has been selectively output by said auxiliary power means with said pedal effort, wherein said auxiliary power means includes an electric motor and a speed reducing means interposed between an output shaft of said electric motor and said force combining means in order to reduce a rotational speed of said electric motor and an electromagnetic clutch is provided between said electric motor and said force combining means.

wherein said loading force is provided as a rotational resistance of said electric motor, which is generated by connecting said electric motor with said force combining means by said electromagnetic clutch under a condition where said electric motor is not supplied with an electric power, and wherein said speed reducing means is provided with a system for changing a reduction ratio, and said auxiliary power means adjusts said loading force by changing the reduction ratio of said speed reducing means.

3. An electromotive power assisted bicycle capable of running by a pedal effort that is assisted with an electric force, said bicycle comprising:

a pedal effort detection means for detecting a pedal effort, an auxiliary power means capable of selecting either one of an electric force or a loading force based on the pedal effort detected by said pedal effort detection means and also capable of adding said selected one to the pedal effort so as to yield a pedal effort level enabling an aerobic exercise, and a rotational speed detection means for detecting a rotational speed of a drive shaft, wherein said auxiliary power means adjusts said pedal effort level based on a power defined by a product of a detected pedal effort and a detected rotational speed of the drive shaft.

4. An electromotive power assisted bicycle in accordance with any one of claims 1-3, further comprising a heart rate detection means for detecting a heart rate of a rider, wherein said auxiliary power means sets said pedal effort level based on at least a heart rate detected by said heart rate detection means.

5. An electromotive power assisted bicycle in accordance with any one of claims 1-3, in which said auxiliary power means is built as a single unit.

6. An electromotive power assisted bicycle in accordance with any one of claims 1-3, in which if the detected pedal effort is higher than said pedal effort level, said auxiliary power means controls said electric force so that pedal effort can fall in the pedal effort level.

7. An electromotive power assisted bicycle in accordance with any of claims 1-3, in which if the detected pedal effort has decreased to be lower than said pedal effort level, said auxiliary power means controls said loading force to be increased until the detected pedal effort reaches the pedal effort level.

8. An electromotive power assisted bicycle in accordance with claim 1, further comprising a battery for supplying said electric motor with an electric power, wherein said battery is charged by an electromotive force generated under a condition where said electric motor supplied with no electric power is revolved by the pedal effort against said loading force.

9. An electromotive power assisted bicycle in accordance with any one of claims 1-3, in which said pedal effort level is set to an approximately constant pedal effort value.

10. An electromotive power assisted bicycle in accordance with claim 3, further comprising a time measuring means for measuring a desired time period, in which if an integral value of said power relating to the time measured by said time measuring means has reached a predetermined value, said auxiliary power means stops an operation mode enabling said aerobic exercise and is shifted to a normal assisting operation mode.

11. An electromotive power assisted bicycle capable of running by a pedal effort that is assisted with an electric force, said bicycle comprising:

a pedal effort detection means for detecting a pedal effort; and an auxiliary power means capable of selecting either one of an electric force or a loading force based on the pedal effort detected by said pedal effort detection means and also capable of adding said selected one to the pedal effort so as to yield a pedal effort level enabling an aerobic exercise, and a heart rate detection means for detecting the heart rate of a rider, wherein said auxiliary power means sets said pedal effort level based on at least a heart rate detected by said heart rate detection means, and the auxiliary power means controls at least one of said electric force and said loading force so that said pedal effort can fall in the pedal effort level.

* * * * *